(12) United States Patent
Kobashi et al.

(10) Patent No.: US 10,793,736 B2
(45) Date of Patent: Oct. 6, 2020

(54) INK SET AND INKJET RECORDING METHOD

(71) Applicants: Toshiyuki Kobashi, Kanagawa (JP); Satoyuki Sekiguchi, Kanagawa (JP)

(72) Inventors: Toshiyuki Kobashi, Kanagawa (JP); Satoyuki Sekiguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 16/355,760

(22) Filed: Mar. 17, 2019

(65) Prior Publication Data

US 2019/0284419 A1 Sep. 19, 2019

(30) Foreign Application Priority Data

Mar. 19, 2018 (JP) .................................. 2018-051775

(51) Int. Cl.
*C09D 11/38* (2014.01)
*C09D 11/36* (2014.01)
*C09D 11/322* (2014.01)
*C09D 11/40* (2014.01)
*C09D 11/326* (2014.01)

(52) U.S. Cl.
CPC ............ *C09D 11/38* (2013.01); *C09D 11/322* (2013.01); *C09D 11/36* (2013.01); *C09D 11/326* (2013.01); *C09D 11/40* (2013.01)

(58) Field of Classification Search
CPC ......... C09D 11/36; C09D 11/38; C09D 11/40; C09D 11/54; C09D 11/102; C09D 11/107; C09D 11/322; C09D 11/326
See application file for complete search history.

(56) References Cited

U.S. PATENT DOCUMENTS

2015/0116421 A1\* 4/2015 Nonogaki ............ C09D 11/326
347/20

FOREIGN PATENT DOCUMENTS

| JP | 2011-246856 | 12/2011 |
| JP | 2016-196621 | 11/2016 |
| JP | 2017-088706 | 5/2017 |

\* cited by examiner

*Primary Examiner* — Anh T Vo
(74) *Attorney, Agent, or Firm* — Oblon, McClelland, Maier & Neustadt, L.L.P.

(57) ABSTRACT

An ink set is provided including a first ink containing a polyvalent metal ion and a second ink containing a copolymer having a structural unit represented by the following general formula (1):

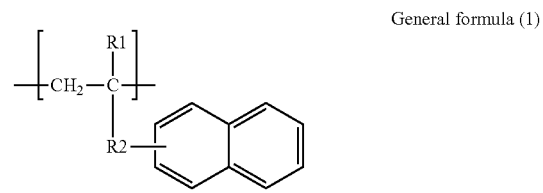

General formula (1)

wherein R1 represents hydrogen atom or a methyl group, and R2 represents one linking group or a combination of two or more linking groups selected from a group consisting of the following linking groups: —COO—, —OCO—, —O—, —NHCONH—, NR3CO— (R3 represents hydrogen atom or an alkyl group having 1 to 6 carbon atoms), an alkylene group having 1 to 12 carbon atoms, an alkyl ether group having 1 to 12 carbon atoms, and —NR4- (R4 represents hydrogen atom or an alkyl group having 1 to 6 carbon atoms).

7 Claims, 1 Drawing Sheet

INK SET AND INKJET RECORDING METHOD

CROSS-REFERENCE TO RELATED APPLICATIONS

This patent application is based on and claims priority pursuant to 35 U.S.C. § 119(a) to Japanese Patent Application No. 2018-051775, filed on Mar. 19, 2018, in the Japan Patent Office, the entire disclosure of which is incorporated by reference herein.

BACKGROUND

Technical Field

The present disclosure relates to an ink set and an inkjet recording method.

Description of the Related Art

Since inkjet printers have such an advantage that color printing can be easily formed on demand, the inkjet printers are widespread as digital signal output apparatuses in general households.

In recent years, not only for household use but also for fields of slow permeation media such as coated paper, non-absorbable media such as plastic film, and fabric media such as woven fabrics and knitted fabrics, it has been demanded to acquire images equivalent to the conventional analog printed images by using an inkjet recording method.

For example, in the field of food packaging, so-called soft packaging, small lot/many kind production in the printing job has progressed rapidly, and furthermore, demand for variable printings has increased. Thus, an inkjet recording system responding to soft packaging films made of polyolefin, polyester, polyamide and the like is desired.

Similarly to the soft packaging field, also in the textile printing field, the market scale of so-called Direct to Garment (DTG) field is expanding year by year, where characters are directly printed on clothing such as T-shirts. Additionally, in recent apparel business, personal recommendation business flourishes, and collaboration with fine art in the interior textile field becomes active. From such a tendency, demand for the inkjet recording system capable of forming images excellent in color developing properties and various fastness properties for fabrics is increasing more and more.

Unlike screen textile printing and other conventional textile printing, a textile printing method of directly forming an image on a textile by inkjet printing using an ink containing a pigment as a colorant does not require plate-related operations such as production, storage, washing of a plate. The method has a superiority from the viewpoints that the method is suitable for small-quantity multiproduct production, can shorten a delivery time because of unnecessity of transfer step or the like, and is excellent in light resistance, and the like. Inks for the method have been developed.

In recent years, there is a growing need for image formation on a textile containing a synthetic fiber such as a polyester material, but there is a problem that when inkjet printing is performed on a synthetic fiber-containing textile such as a polyester textile, color developing property is inferior compared to natural fibers such as cotton.

In attempting to deal with the above problem, a method of applying pretreatment to a cloth prior to printing an ink on the cloth has been proposed. However, in this method, pigments do not sufficiently remain on a surface of a textile containing a synthetic fiber such as a polyester fiber, and an image density desired in the market has not yet been obtained.

SUMMARY

An embodiment of the present invention provides an ink set including a first ink containing a polyvalent metal ion and a second ink containing a copolymer having a structural unit represented by the following general formula (1).

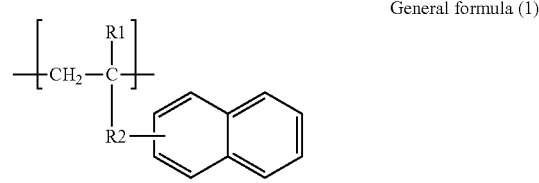

General formula (1)

In general formula (1), R1 represents hydrogen atom or a methyl group, and R2 represents one linking group or a combination of two or more linking groups selected from a group consisting of the following linking groups: —COO—, —OCO—, —O—, —NHCONHH—, NR3CO— (R3 represents hydrogen atom or an alkyl group having 1 to 6 carbon atoms), an alkylene group having 1 to 12 carbon atoms, an alkyl ether group having 1 to 12 carbon atoms, and —NR4- (R4 represents hydrogen atom or an alkyl group having 1 to 6 carbon atoms).

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
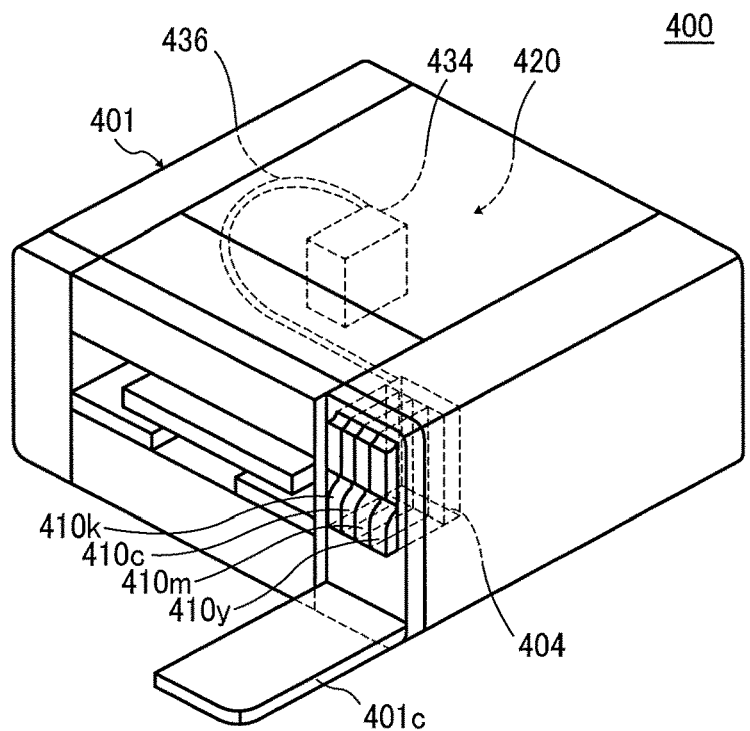
FIG. 1 is an explanatory perspective diagram of a recording apparatus according to an embodiment of the present invention.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

One aspect of the invention can provide an ink set which can achieve high image quality in coated papers, plastic films, and fabric media, and is excellent in color developing property particularly on a textile containing a synthetic fiber.

The inventors of the present invention have found that a high color developing property on a textile containing a synthetic fiber can be achieved by applying an ink containing a polymer having a naphthyl group at a terminal of a side chain on the recording medium (textile) coated with a pretreated ink containing a polyvalent metal salt.

When the copolymer has the structural unit represented by general formula (2) the copolymer is excellent in long-term storage stability when used as a pigment dispersion resin, retains pigment dispersibility even when adding a hydrophilic organic solvent to an aqueous ink, and can secure storage stability for a long term, which is preferable.

In addition, when L is an alkylene group having 2 to 18 carbon atoms, a hydrophilic moiety and a hydrophobic moiety in the copolymer are arranged at an appropriate distance, and the copolymer can exhibit good dispersion stability when used as a pigment dispersion resin, which is preferable.

When the second ink contains the copolymer having the structural unit represented by general formula (3), an excellent ink aggregation effect can be obtained by action of the polyvalent metal ion in the recording medium coated with the pretreated ink, which is preferable.

When a dry matter obtained by drying the second ink has a storage modulus G' of $7.0 \times 10^8$ Pa or lower in the dynamic viscoelasticity measurement at 25 degrees C., an excellent fastness property can be obtained due to high flexibility, which is preferable. A case in which the storage modulus G' is $4.0 \times 10^8$ Pa or lower is more preferable.

The storage modulus G' of the dry matter obtained by drying the ink at 25 degrees C. can be controlled by adjusting a molecular weight and a glass transition temperature of the resin, and, in a case in which the resin has a crosslinked structure based on tri- or more functional monomers, by adjusting a concentration of the monomers in the resin, and a concentration of hydrogen bond-generating components such as an urethane group and an urea group, and the like.

A dried film of an ink subjected to the dynamic viscoelasticity measurement test can be obtained by drying the ink at 40 degrees C. for 12 hours, subsequently at 150 degrees C. for 12 hours, and then under reduced pressure at 150 degrees C. for 3 hours. The test piece used for the dynamic viscoelasticity measurement at 25 degrees C. has sizes of 0.2 mm to 0.5 mm in film thickness, 20 mm in length, and 4.5 mm to 5.5 mm in width. Among the sizes of the test piece, the film thickness can be controlled by adjusting the concentration of ink to be dried.

The dynamic viscoelasticity of the dried ink film at 25 degrees C. is measured using ARES-G2 with a freezer (manufactured by TA Instruments Inc.). The test piece is set in the apparatus using a torsion clamp as a test piece-fixing jig at 20 degrees C., and then cooled to −70 degrees C. with applying an auto tension of 2 g. Ten minutes after the temperature reaches −70 degrees C., measurements are carried out under the following measurement conditions. From the obtained measurement data, the storage modulus at 25 degrees C. is read.

[Measurement Conditions]

Measurement mode: temperature sweep

Range of measurement temperature: −70 degrees C. to 160 degrees C.

Increase rate: 4 degrees C./min

Frequency: 1 Hz

Initial strain: 0.1%

Auto tension: 2 g

When the second ink contains an urethane resin, excellent fastness property is resulted from high flexibility, which is preferable.

When the first ink contains an urethane resin, excellent fastness property is resulted from high flexibility, which is preferable. Furthermore, a case of a combination of the first ink with the second ink containing the urethane resin is more preferable because the resin of the first ink is compatible with the resin of the second ink to form a rigid resin film.

When the ink set is an ink set for textile printing, excellent color developing property and fastness property for the recording medium can be obtained, which is preferable.

Hereinafter, constituents of the ink set of the present disclosure will be explained.

<First Ink>

Hereinafter, the polyvalent metal ion used in the first ink of the present disclosure will be described.

The polyvalent metal ion can be appropriately selected from known materials. Examples of the polyvalent metal ion include, but are not limited to, calcium ion, magnesium ion, and aluminum ion. These may be used alone or in combination.

The polyvalent metal ion can be contained in the first ink by dissolving a water-soluble polyvalent metal salt in the first ink.

The polyvalent metal salt can be appropriately selected from known materials. Preferable examples of the polyvalent metal salt include, but are not limited to, a carboxylate (acetic acid, lactic acid, etc.), a sulfate, a nitrate, a chloride, and a thiocyanate. These polyvalent metal salts may be used alone or in combination. Above all, a carboxylate, a sulfate, a nitrate, and a chloride which are excellent in solubility in water and solubility in water-soluble organic solvents are preferable for image quality such as color developing property and bleed resistance, and discharge reliability.

A content of the polyvalent metal ion in the first ink is preferably 0.05 to 0.5 mol/kg for suppression of bleeding and density unevenness, color developing property, fastness property, and adhesiveness.

<Second Ink>

Hereinafter, the copolymer, the colorant, and the pigment dispersion used for the second ink of the present disclosure will be explained.

<Copolymer>

The copolymer is contained as a dispersant for the colorant.

The copolymer has a structural unit containing naphthyl group, and further optionally has another structural unit.

The structural unit containing naphthyl group refers to a structural unit represented by the following general formula (1).

General formula (1)

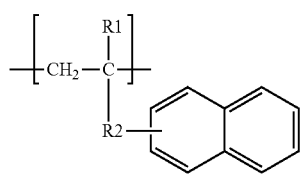

In general formula (1), R1 represents hydrogen atom or a methyl group, and R2 represents one linking group or a combination of two or more linking groups selected from a group consisting of the following linking groups: —COO—, —OCO—, —O—, —NHCONH—, NR3CO— (R3 represents hydrogen atom or an alkyl group having 1 to 6 carbon atoms), an alkylene group having 1 to 12 carbon atoms, an alkyl ether group having 1 to 12 carbon atoms, and —NR4- (R4 represents hydrogen atom or an alkyl group having 1 to 6 carbon atoms).

The structural unit represented by general formula (1) is preferably a structural unit represented by the following general formula (2).

General formula (2)

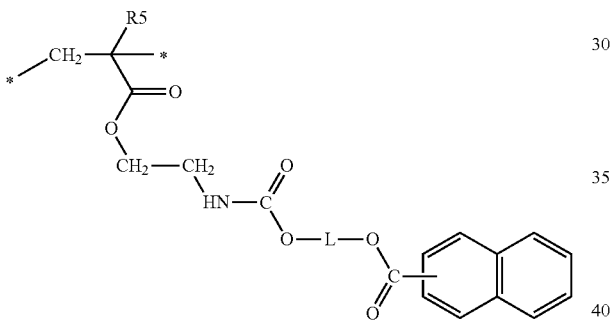

In general formula (2), R5 represents hydrogen atom or a methyl group, and L represents a single bond or an alkylene group having 2 to 18 carbon atoms.

Examples of a monomer comprising the structural unit represented by general formula (2) include, but are not limited to, compounds represented by the following structural formulas (1) to (3).

Structural formula (1)

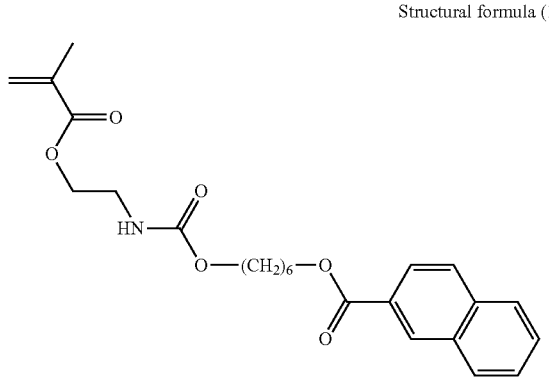

Structural formula (2)

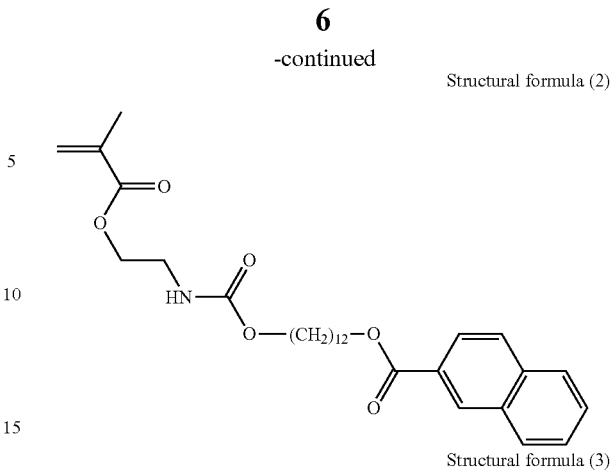

Structural formula (3)

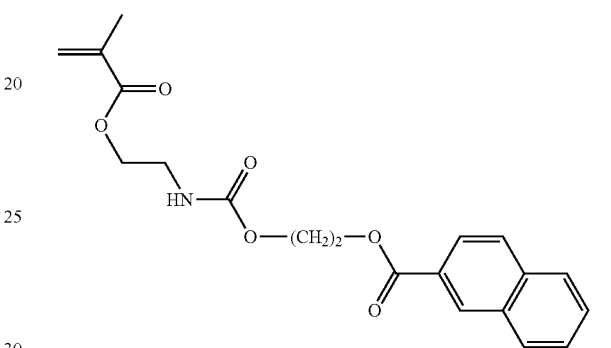

The ink preferably contains a copolymer having a structural unit represented by the following genera formula (3).

General formula (3)

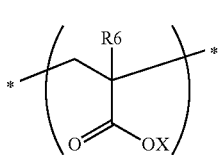

In general formula (3), R6 represents hydrogen atom or a methyl group, and X represents hydrogen atom or a cation. When X is a cation, the oxygen adjacent to the cation is in a form of O⁻.

Examples of the cation of X in general formula (3) include, but are not limited to, sodium ion, potassium ion, lithium ion, tetramethylammonium, tetraethylammonium ion, tetrapropylammonium ion, tetrabutylammonium ion, tetrapentylammonium ion, tetrahexylammonium ion, triethylmethylammonium ion, tributylmethylammonium ion, trioctylmethylammonium ion, 2-hydroxyethyltrimethyl ammonium ion, tris(2-hydroxyethyl)methyl ammonium ion, propyltrimethylammonium ion, hexyltrimethylammonium ion, octyltrimethylammonium ion, nonyltrimethylammonium ion, decyltrimethylammonium ion, dodecyltrimethyl ammonium ion, tetradecyltrimethylammonium ion, hexadecyltrimethylammonium ion, octadecyltrimethylammonium ion, didodecyldimethylammonium ion, ditetradecyldimethylammonium ion, dihexadecyl dimethylammonium ion, dioctadecyldimethylammonium ion, ethylhexadecyldimethylammonium ion, ammonium ion, dimethylammonium ion, trimethylammonium ion, monoethylammonium ion, diethylammonium ion, triethylammonium ion, monoethanolammonium ion, diethanolammonium ion, triethanolammonium ion, methylethanol ammonium ion, methyldiethanolammonium ion, dimethylethanolammonium ion, monopropanolammonium ion, dipropanolammonium ion, tripropanolammonium ion, isopropanolammonium ion, morpholinium ion, N-methylmorpholinium ion, N-methyl-2-pyrrolidonium ion, and 2-pyrrolidonium ion.

Examples of a monomer having the structural unit represented by general formula (3) include, but are not limited to, acrylic acid, methacrylic acid, and a salt thereof.

In addition to the structural units represented by general formulas (1) or (2) and (3), the copolymer may have a repeating unit derived from another polymerizable monomer.

The other polymerizable monomer is not particularly limited, and can be appropriately selected depending on the intended purpose. Examples of the other polymerizable monomer include, but are not limited to, a hydrophobic polymerizable monomer, a hydrophilic polymerizable monomer, and a polymerizable surfactant.

Examples of the hydrophobic polymerizable monomer include, but are not limited to: an unsaturated ethylene monomer having an aromatic ring, such as styrene, α-methylstyrene, 4-t-butylstyrene, and 4-chloromethylstyrene; an alkyl (meth)acrylate such as methyl (meth)acrylate, ethyl (meth)acrylate, n-butyl (meth)acrylate, dimethyl maleate, dimethyl itaconate, dimethyl fumarate, lauryl (meth)acrylate (C12), tridecyl (meth)acrylate (C13), tetradecyl (meth)acrylate (C14), pentadecyl (meth)acrylate (C15), hexadecyl (meth)acrylate (C16), heptadecyl (meth)acrylate (C17), nonadecyl (meth)acrylate (C19), eicosyl (meth)acrylate (C20), heneicosyl (meth)acrylate (C21), and docosyl (meth)acrylate (C22); and an unsaturated ethylene monomer having an alkyl group, such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, and 1-docosene. These may be used alone or in combination.

Examples of the hydrophilic polymerizable monomer include, but are not limited to, an anionic unsaturated ethylene monomer such as maleic acid or a salt thereof, monomethyl maleate, itaconic acid, monomethyl itaconate, fumaric acid, 4-styrenesulfonic acid, 2-acrylamide-2-methylpropanesulfonic acid, and an unsaturated ethylene monomer containing phosphoric acid, phosphonic acid, alendronic acid or etidronic acid; and a nonionic unsaturated ethylene monomer such as 2-hydroxyethyl (meth)acrylate, diethylene glycol mono(meth)acrylate, triethylene glycol mono(meth)acrylate, tetraethylene glycol mono(meth)acrylate, (meth)acrylamide, N-methylol-(meth)acrylamide, N-vinylformamide, N-vinylacetamide, N-vinylpyrrolidone, acrylamide, N,N-dimethyl acrylamide, N-t-butylacrylamide, N-octylacrylamide, and N-t-octylacrylamide. These may be used alone or in combination.

Contents of the hydrophobic polymerizable monomer and the hydrophilic polymerizable monomer are preferably 5% by mass to 100% by mass based on the total amount of monomers constituting the structural units represented by general formulas (1) or (2) and (3).

The polymerizable surfactant is an anionic or nonionic surfactant having at least one radically polymerizable unsaturated double bond group in the molecule. Examples of the anionic surfactant include, but are not limited to: a hydrocarbon compound having a sulfate group such as an ammonium sulfate group ($-SO_3-NH_4^+$), and an allyl group ($-CH_2-CH=CH_2$); a hydrocarbon compound having a sulfate group such as an ammonium sulfate group ($-SO_3-NH_4+$), and a methacryl group [$-CO-C(CH_3)=CH_2$]; and an aromatic hydrocarbon compound having a sulfate group such as an ammonium sulfate group ($-SO_3-NH_4^+$), and a 1-propenyl group ($-CH=CH_2CH_3$).

Examples of commercially available products of the anionic surfactant include, but are not limited to: ELEMINOL JS-20 and RS-300 manufactured by Sanyo Chemical Industries, Ltd.; and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 manufactured by DKS Co. Ltd.

Examples of the nonionic surfactant include, but are not limited to, a hydrocarbon compound or an aromatic hydrocarbon compound which have a 1-propenyl group ($-CH=CH_2CH_3$) and a polyoxyethylene group [$-(C_2H_4O)_n-H$]. Examples of commercially available products of the nonionic surfactant include, but are not limited to: Aqualon RN-20, Aqualon RN-2025, Aqualon RN-30, and Aqualon RN-50 manufactured by DKS Co. Ltd.; and LATEMUL PD-104, LATEMUL PD-420, LATEMUL PD-430, and LATEMUL PD-450 manufactured by Kao Corporation.

These polymerizable surfactants may be used alone or in combination. A content of the polymerizable surfactant is preferably 0.1% by mass to 10% by mass based on the total amount of monomers constituting the structural units represented by general formulas (1) or (2) and (3).

<Method for Producing Copolymer>

The method for producing the copolymer used in the present disclosure is not particularly limited. The copolymer can be synthesized by various polymerization methods, e.g., a known polymerization method such as bulk polymerization, solution polymerization, suspension polymerization, and emulsion polymerization. The polymerization reaction can be carried out by a known operation such as a batch system, a semi-continuous system, and a continuous system. Examples of the polymerization method include, but are not limited to, preferably a radical polymerization using a radical polymerization initiator described below, and more preferably a solution polymerization using a mixed solvent of an organic solvent and water because the polymerization operation and molecular weight adjustment are easy.

The copolymer having the structural units represented by general formulas (1) or (2) and (3) is obtained by reacting a monomer component in a solvent in a flask equipped with a stirrer, a thermometer, and a nitrogen-introducing tube in the presence of a polymerization initiator under reflux of nitrogen gas at 50 degrees C. to 150 degrees C. A viscosity of an aqueous solution or aqueous dispersion of the synthesized copolymer can be adjusted by changing a molecular weight of the copolymer, and may be adjusted by changing a monomer concentration during polymerization, a content of a polymerization initiator, a polymerization temperature, and a polymerization time.

In relation to the polymerization temperature, there is a tendency that when polymerization is carried out at a high temperature for a short period, a low molecular weight copolymer can be easily obtained, and when polymerization is carried out at a low temperature for a long period, a high molecular weight copolymer can be easily obtained. In relation to the content of the polymerization initiator, there is a tendency that when the content is larger, a low molecular weight copolymer can be easily obtained, and when the content is smaller, a high molecular weight copolymer can be easily obtained. In relation to the monomer concentration during the reaction, there is a tendency that when the concentration is higher, a low molecular weight copolymer can be easily obtained, and when the concentration is lower, a high molecular weight copolymer can be easily obtained.

The number average molecular weight and the weight average molecular weight of the copolymer of the present disclosure are preferably 500 to 10,000 and 1,500 to 30,000 respectively, and more preferably 1,000 to 10,000 and 3,000 to 30,000 respectively, in terms of polystyrene.

For preparing the copolymer of the present disclosure containing the structural unit represented by general formula (2) and the structural unit represented by general formula (3), first, naphthalene carbonyl chloride (A-1) and an excess amount of a diol compound are condensation-reacted in the presence of an acid acceptance agent such as amine or pyridine to obtain hydroxyalkyl naphthalenecarboxylate (A-2), as presented in the following reaction formulas (1) to (3). Subsequently, the (A-2) is reacted with 2-methacryloyloxyethyl isocyanate (A-3) to obtain a monomer (A-4), and then the monomer (A-4) is copolymerized with a (meth) acrylic acid monomer (A-5) in the presence of a radical polymerization initiator to obtain a copolymer (A-6) used in the present disclosure. Herein, a weight average molecular weight of the monomer (A-4) is 357 to 596 because L in general formula (2) is an alkylene group having 2 to 18 carbon atoms and R1 is hydrogen atom or a methyl group.

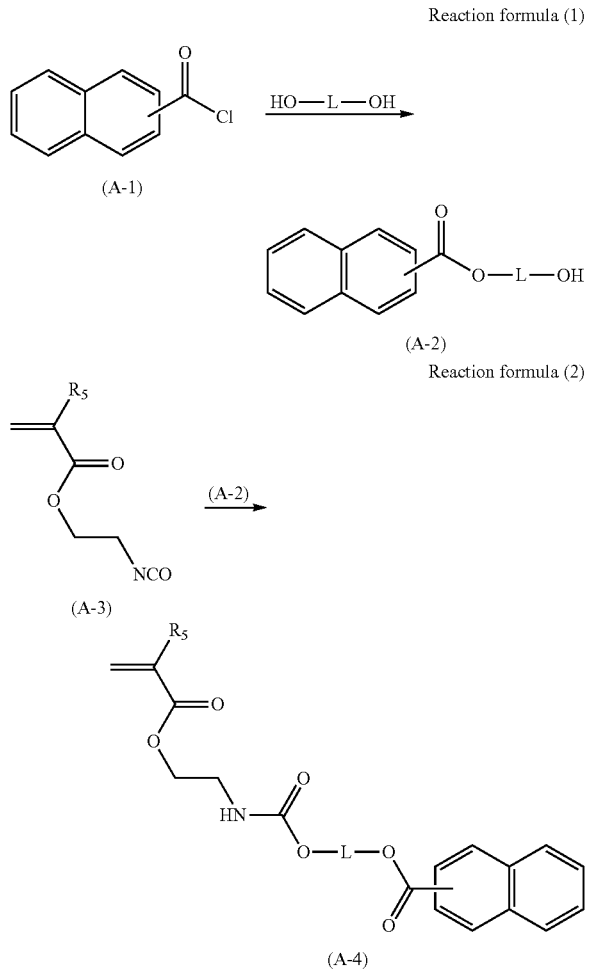

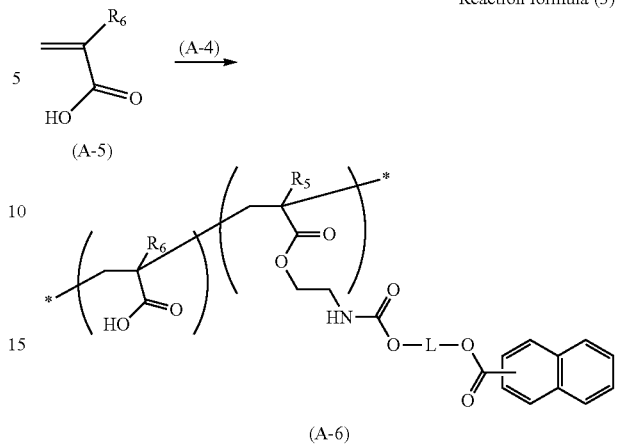

In reaction formulas (1) to (3), R5, R6, and L are the same as those defined in general formulas (2) and (3).

The radical polymerization initiator is not particularly limited, and can be appropriately selected depending on the intended purpose. Examples of the radical polymerization initiator include, but are not limited to, peroxyketal, hydroperoxide, dialkyl peroxide, diacyl peroxide, peroxydicarbonate, peroxy ester, cyano type azobisisobutyronitrile, azobis(2-methylbutyronitrile), azobis(2,2'-isovaleronitrile), and non-cyano type dimethyl-2,2'-azobisisobutyrate. Above all, the organic peroxides and the azo type compounds are preferable, and the azo type compounds are particularly preferable for easy control of the molecular weight and low decomposition temperature.

A content of the radical polymerization initiator is not particularly limited, and can be appropriately selected depending on the intended purpose, but is preferably 1% by mass to 10% by mass based on the total amount of the polymerizable monomers.

For the purpose of adjusting the molecular weight of the polymer, an appropriate amount of a chain-transfer agent may be added.

Examples of the chain-transfer agent include, but are not limited to, mercaptoacetic acid, mercaptopropionic acid, 2-propanethiol, 2-mercaptoethanol, thiophenol, dodecylmercaptan, 1-dodecanethiol, and thioglycerol.

The polymerization temperature is not particularly limited, and can be appropriately selected depending on the intended purpose, but is preferably 50 degrees C. to 150 degrees C., more preferably 60 degrees C. to 100 degrees C. Also, the polymerization time is not particularly limited, and can be appropriately selected depending on the intended purpose, but is preferably 3 hours to 48 hours.

As a method for dispersing the pigment using the copolymer, a kneading and dispersing machine using a ball such as a bead mill or a ball mill, a kneading and dispersing machine using a shearing force such as a roll mill, an ultrasonic dispersing machine, and the like, can be used.

<Ink>

Hereinafter, the organic solvent, water, the colorant, the resin, and the additive used in the ink will be explained.

<Colorant>

The colorant is not particularly limited. For the colorant, a pigment and a dye can be used.

As the pigment, an inorganic pigment or an organic pigment can be used. These may be used alone or in combination. Also, a mixed crystal may be used.

As the pigment, for example, a black pigment, a yellow pigment, a magenta pigment, a cyan pigment, a white pigment, a green pigment, an orange pigment, a glossy color pigment such as gold and silver, a metallic pigment, and the like can be used.

As the inorganic pigment, titanium oxide, iron oxide, calcium carbonate, barium sulfate, aluminum hydroxide, barium yellow, cadmium red, chromium yellow, and additionally, carbon black produced by a known method such as a contact method, a furnace method, and a thermal method can be used.

As the organic pigment, an azo pigment, a polycyclic pigment (e.g., phthalocyanine pigment, perylene pigment, perinone pigment, anthraquinone pigment, quinacridone pigment, dioxazine pigment, indigo pigment, thioindigo pigment, isoindolinone pigment, quinophthalone pigment), a dye chelate (e.g., basic dye type chelate, acidic dye type chelate), a nitro pigment, a nitroso pigment, and an aniline black can be used. Above all, a pigment having a good affinity for the solvent is suitably used. In addition, a resin hollow particle and an inorganic hollow particle can also be used.

Specific examples of the black pigment include, but are not limited to, a carbon black (Color Index (C.I.) Pigment Black 7) such as furnace black, lamp black, acetylene black, and channel black, a metal such as copper, iron (C.I. Pigment Black 11), and titanium oxide, and an organic pigment such as aniline black (C.I. Pigment Black 1).

Furthermore, examples of the colored pigment include, but are not limited to, C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213, C. I. Pigment Orange 5, 13, 16, 17, 36, 43, and 51, C. I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (Rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264, C. I. Pigment Violet 1 (Rhodamine Lake), 3, 5:1, 16, 19, 23, and 38, C. I. Pigment Blue 1, 2, 15 (Phthalocyanine Blue), 15:1, 15:2, 15:3, 15:4 (Phthalocyanine Blue), 16, 17:1, 56, 60, and 63, and C. 1. Pigment Green 1, 4, 7, 8, 10, 17, 18, and 36.

The dye is not particularly limited. For the dye, an acidic dye, a direct dye, a reactive dye, and a basic dye may be used alone or in combination.

Examples of the dye include, but are not limited to, C. I. Acid Yellow 17, 23, 42, 44, 79, and 142, C. I. Acid Red 52, 80, 82, 249, 254, and 289, C. I. Acid Blue 9, 45, and 249, C. I. Acid Black 1, 2, 24, and 94, C. I. Food Black 1 and 2, C. I. Direct Yellow 1, 12, 24, 33, 50, 55, 58, 86, 132, 142, 144, and 173, C. I. Direct Red 1, 4, 9, 80, 81, 225, and 227, C. I. Direct Blue 1, 2, 15, 71, 86, 87, 98, 165, 199, and 202, C. I. Direct Black 19, 38, 51, 71, 154, 168, 171, and 195, C. 1. Reactive Red 14, 32, 55, 79, and 249, and C. 1. Reactive Black 3, 4, and 35.

A content of the colorant in the ink is preferably 0.1% by mass to 15% by mass, more preferably 1% by mass to 10% by mass, for improved image density, and good fixity and discharge stability.

<Pigment Dispersion>

An ink can be obtained by blending materials such as water and an organic solvent with a pigment. Also, a pigment dispersion prepared by mixing a pigment with other components such as water and a dispersant can be blended with materials such as water and an organic solvent to produce an ink.

The pigment dispersion is obtained by mixing and dispersing water, a pigment, a pigment dispersant and optionally other components, and adjusting the particle size of the pigment. It is preferable to use a disperser for dispersion. The particle diameter of the pigment in the pigment dispersion is not particularly limited. However, for preferable dispersion stability of the pigment, high discharge stability, and high image quality such as image density, the diameter of the highest-frequency particle in terms of the maximum number of particles is preferably 20 nm to 500 nm, more preferably 20 nm to 150 nm. The particle diameter of the pigment can be measured using a particle size analyzer (Nanotrac Wave-UT 151, manufactured by MicrotracBEL Corp.).

A content of the pigment in the pigment dispersion is not particularly limited, and can be appropriately selected depending on the intended purpose. However, for good discharge stability and high image density, the content is preferably 0.1% by mass to 50% by mass, and more preferably 0.1% by mass to 30% by mass.

Preferably, the pigment dispersion is optionally filtered to remove coarse particles by a filter, a centrifuge, or the like, and degassed.

The first and second inks may contain water, an organic solvent, a resin, and optionally other components.

<Organic Solvent>

The organic solvent used in the present disclosure is not particularly limited, and a water-soluble organic solvent can be used. Examples of the water-soluble organic solvent include, but are not limited to, a polyhydric alcohol, an ether such as polyhydric alcohol alkyl ether and polyhydric alcohol aryl ether, as well as a nitrogen-containing heterocyclic compound, an amide, an amine, and a sulfur-containing compound.

Specific examples of the water-soluble organic solvent include, but are not limited to: a polyhydric alcohol such as ethylene glycol, diethylene glycol, 1,2-propanediol, 1,3-propanediol, 1,2-butanediol, 1,3-butanediol, 1,4-butanediol, 2,3-butanediol, 3-methyl-1,3-butanediol, triethylene glycol, polyethylene glycol, polypropylene glycol, 1,2-pentanediol, 1,3-pentanediol, 1,4-pentanediol, 2,4-pentanediol, 1,5-pentanediol, 1,2-hexanediol, 1,6-hexanediol, 1,3-hexanediol, 2,5-hexanediol, 1,5-hexanediol, glycerin, 1,2,6-hexanetriol, 2-ethyl-1,3-hexanediol, ethyl-1,2,4-butanetriol, 1,2,3-butanetriol, 2,2,4-trimethyl-1,3-pentanediol, and 3-methyl-1,3,5-pentanetriol; a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; a polyhydric alcohol aryl ether such as ethylene glycol monophenyl ether, and ethylene glycol monobenzyl ether; a nitrogen-containing heterocyclic compound such as 2-pyrrolidone, N-methyl-2-pyrrolidone, N-hydroxyethyl-2-pyrrolidone, 1,3-dimethyl-2-imidazolidinone, ε-caprolactam, and γ-butyrolactone; an amide such as formamide, N-methylformamide, N,N-dimethylformamide, 3-methoxy-N,N-dimethylpropionamide, 3-butoxy-N,N-dimethylpropionamide; an amine such as monoethanolamine, diethanolamine, and triethylamine; a sulfur-containing compound such as dimethylsulfoxide, sulfolane, and thiodiethanol; as well as propylene carbonate, and ethylene carbonate.

Preferably, an organic solvent having a boiling point of 250 degrees C. or lower is used, because such an organic solvent functions as a wetting agent and furthermore provides a good drying property.

A polyol compound having 8 or more carbon atoms, and a glycol ether compound are also suitably used. Specific examples of the polyol compound having 8 or more carbon atoms include, but are not limited to, 2-ethyl-1,3-hexanediol and 2,2,4-trimethyl-1,3-pentanediol.

Specific examples of the glycol ether compound include, but are not limited to: a polyhydric alcohol alkyl ether such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; and a polyhydric alcohol aryl ether such as ethylene glycol monophenyl ether and ethylene glycol monobenzyl ether.

When paper is used as a recording medium, the polyol compound having 8 or more carbon atoms and the glycol ether compound can improve permeability of the ink.

A content of the organic solvent in the ink is not particularly limited, and can be appropriately selected depending on the intended purpose. However, for drying property and discharge reliability of the ink, the content is preferably 10% by mass to 60% by mass, and more preferably 20% by mass to 60% by mass.

<Water>

A content of water in the ink is not particularly limited, and can be appropriately selected depending on the intended purpose. However, for drying property and discharge reliability of the ink, the content is preferably 10% by mass to 90% by mass, and more preferably 20% by mass to 60% by mass.

<Resin>

The type of the resin contained in the ink is not particularly limited, and can be appropriately selected depending on the intended purpose. Examples of the resin include, but are not limited to, an urethane resin, a polyester resin, an acrylic resin, a vinyl acetate-based resin, a styrene-based resin, a butadiene-based resin, a styrene-butadiene-based resin, a vinyl chloride-based resin, an acrylic styrene-based resin, and an acrylic silicone-based resin. Above all, the urethane resin is preferable for fastness property.

A resin particle composed of these resins may be used. In a state of a resin emulsion in which the resin particle is dispersed in water as a dispersant, the resin particle can be mixed with a material such as a colorant and an organic solvent to obtain an ink. As the resin particle, a synthesized resin particle may be appropriately used, or a commercially available product may be used. In addition, these resin particles may be used alone or in combination.

<Urethane Resin>

The urethane resin may have not only a soft segment attributed to a polymer polyol moiety but also a hard segment attributed to a polyamine or a short-chain polyol moiety. The soft segment has a structure of interaction between soft segment moieties, and the hard segment has a structure of interaction between hard segment moieties, so that urethane resin excellent in elasticity and toughness can be formed, and images excellent in fastness property can be obtained.

<Method for Producing Urethane Resin>

The urethane resin can be produced by a conventionally used method, e.g., the following method.

First, in the absence of a solvent or in the presence of an organic solvent, a polymer polyol containing a polymer polyol having the structural unit represented by general formula (1), optionally a short-chain polyol, a polyhydric alcohol having an anionic group, and a polyisocyanate are reacted to produce an isocyanate-terminated urethane prepolymer, or an organic solvent solution of the isocyanate-terminated urethane prepolymer.

Subsequently, the isocyanate-terminated urethane prepolymer, or the organic solvent solution of the isocyanate-terminated urethane prepolymer is added with water, to be dispersed in water, then chain-extended by a reaction with a polyamine, and optionally the organic solvent in the system is removed to obtain the urethane resin.

Examples of the organic solvent include, but are not limited to: a ketone such as acetone and methylethylketone; an ether such as tetrahydrofuran and dioxane; an acetate such as ethyl acetate and butyl acetate; a nitrile such as acetonitrile; an amide such as dimethylformamide, N-methylpyrrolidone, and 1-ethyl-2-pyrrolidone. These may be used alone or in combination.

As the polymer polyol, in addition to the polymer polyol having the structural unit represented by the general formula (1), a known polymer polyol can be appropriately used in combination. Examples of the polymer polyol include, but are not limited to, a polycarbonate-based polymer polyol, a polyether-based polymer polyol, a polyester-based polymer polyol, and a polycaprolactone-based polymer polyol. These may be used alone or in combination.

The polymer polyol has a number average molecular weight of preferably 300 to 5,000, and more preferably 500 to 3,000. When the polymer polyol has a number average molecular weight outside the above range, the fastness property and the adhesiveness may deteriorate.

Examples of the short-chain polyol include, but are not limited to, polyhydric alcohols having 2 to 15 carbon atoms such as ethylene glycol, propylene glycol, 1,4-butanediol, 1,5-pentanediol, neopentyl glycol, 1,6-hexanediol, 1,8-octanediol, 1,4-cyclohexane dimethanol, diethylene glycol, glycerin, and trimethylolpropane.

Examples of the polyisocyanate include, but are not limited to: an aromatic polyisocyanate compound such as 1,3-phenylene diisocyanate, 1,4-phenylene diisocyanate, 2,4-tolylene diisocyanate (TDI), 2,6-tolylene diisocyanate, 4,4'-di phenylm ethane diisocyanate (MDI), 2,4-diphenylmethane diisocyanate, 4,4'-diisocyanatobiphenyl, 3,3'-dimethyl-4,4'-dii socyanatobiphenyl, 3,3'-dimethyl-4,4'-diisocyanatodiphenylmethane, 1,5-naphthylene diisocyanate, 4,4,4',4"-triphenylmethane triisocyanate, m-isocyanatophenylsulfonyl isocyanate, and p-isocyanatophenylsulfonyl isocyanate; an aliphatic polyisocyanate compound such as ethylene diisocyanate, tetramethylene diisocyanate, hexamethylene diisocyanate (HDI), dodecamethylene diisocyanate, 1,6,11-undecane triisocyanate, 2,2,4-trimethylhexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate; and an alicyclic polyisocyanate compound such as isophorone diisocyanate (IPDT), 4,4'-dicyclohexylmethane diisocyanate (hydrogenated MDI), methylcyclohexylene diisocyanate (hydrogenated TDI), bis(2-isocyanatoethyl)-4-dicyclohexene-1,2-dicarboxylate, 2,5-norbornane diisocyanate, and 2,6-norbornane diisocyanate. These may be used alone or in combination.

Above all, the aliphatic polyisocyanate compound and the alicyclic polyisocyanate compound are preferable, the alicyclic polyisocyanate compound is more preferable, and isophorone diisocyanate and 4,4'-dicyclohexylmethane diisocyanate are particularly preferable.

Examples of the polyamine include, but are not limited to; a diamine such as ethylenediamine, 1,2-propanediamine, 1,6-hexamethylenediamine, piperazine, 2,5-dimethylpiperazine, isophoronediamine, 4,4'-dicyclohexylmethanediamine, and 1,4-cyclohexanediamine; a polyamine such as diethylenetriamine, dipropylenetriamine, and triethylenetetramine; a hydrazine such as hydrazine, N,N'-dimethylhydrazine, and 1,6-hexamethylenebis hydrazine; and a dihydrazide such as succinic acid dihydrazide, adipic acid dihydrazide, glutaric acid dihydrazide, sebacic acid dihydrazide, and isophthalic acid dihydrazide.

The urethane resin may have a hydrogen bond which is one of inherent features, and optionally a chemical crosslink attributed to a covalent bond in the molecular structure. When the urethane resin has the chemical crosslink attributed to the covalent bond, a final image is excellent in solvent resistance, and lamination strength in dry lamination can be improved.

The chemical crosslink may be introduced by using, for example, a tri- or more functional polymer polyol, a short-chain polyol, a polyisocyanate, a polyamine, or the like.

The chemical crosslink may be introduced using these compounds alone or in combination.

Examples of the anionic group include, but are not limited to, a carboxyl group and a sulfonic acid group. The anionic group can be introduced by using a polyol having an anionic group. Examples of the polyol having an anionic group include, but are not limited to, 2,2-dimethylolpropionic acid, 2,2-dimethylolbutanoic acid, 2,2-dimethylolheptanoic acid, and 2,2-dimethyloloctanoic acid.

Examples of a neutralizer which can be used for neutralizing the anionic group include, but are not limited to; a basic compound, e.g., an organic amine such as ammonia, triethylamine, pyridine, and morpholine, and an alkanolamine such as monoethanolamine; and a water-soluble alkaline inorganic group containing Na, K, Li, or Ca.

A volume average particle diameter of the resin particle is not particularly limited, and can be appropriately selected depending on the intended purpose. However, for good fixity and high image hardness, the volume average particle diameter is preferably 10 nm to 1,000 nm, more preferably 10 nm to 200 nm, and particularly preferably 10 nm to 100 nm.

The volume average particle diameter can be measured using a particle size analyzer (Nanotrac Wave-UT 151, manufactured by MicrotracBEL Corp.).

A content of the resin is not particularly limited, and can be appropriately selected depending on the intended purpose. However, for fixity and storage stability of the ink, the content is preferably 1% by mass to 30% by mass, and more preferably 5% by mass to 20% by mass, based on the total amount of the ink.

The particle diameter of the solid content in the ink is not particularly limited, and can be appropriately selected depending on the intended purpose. However, for improving discharge stability and image quality such as image density, the diameter of the highest-frequency particle in terms of the maximum number of particles is preferably 20 nm to 1,000 nm, and more preferably 20 nm to 150 nm. The solid content contains resin particles, pigment particles, and the like. The particle diameter can be measured using a particle size analyzer (Nanotrac Wave-UT 151, manufactured by MicrotracBEL Corp.).

<Additives>

A surfactant, an antifoaming agent, an antiseptic and antifungal agent, an antirust agent, a pH conditioner, and the like may be optionally added to the ink.

<Surfactant>

As the surfactant, any of a silicone-based surfactant, a fluorine-based surfactant, an amphoteric surfactant, a nonionic surfactant, and an anionic surfactant can be used.

The silicone-based surfactant is not particularly limited and can be appropriately selected depending on the intended purpose. Above all, a surfactant which does not decompose even at a high pH is preferable, and examples of the surfactant include, but are not limited to, a side-chain-modified polydimethylsiloxane, a both-end-modified polydimethylsiloxane, a one-end-modified polydimethylsiloxane, and a side-chain-both-end-modified polydimethylsiloxane.

A surfactant having polyoxyethylene group or a polyoxyethylene polyoxypropylene group as a modified group is particularly preferable because of desirable properties as the aqueous surfactant. As the silicone-based surfactant, a polyether-modified silicone-based surfactant can also be used, and is exemplified by a compound in which a polyalkylene oxide structure is introduced into a side chain of an Si moiety of dimethylsiloxane.

As the fluorine-based surfactant, for example, a perfluoroalkyl sulfonic acid compound, a perfluoroalkyl carboxylic acid compound, a perfluoroalkyl phosphate compound, an ethylene oxide-added perfluoroalkyl, and a polyoxyalkylene ether polymer compound having a perfluoroalkyl ether group on the side chain are particularly preferable because of low foamability. Examples of the perfluoroalkyl sulfonic acid compound include, but are not limited to, perfluoroalkyl sulfonic acid and perfluoroalkyl sulfonate. Examples of the perfluoroalkyl carboxylic acid compound include, but are not limited to, perfluoroalkyl carboxylic acid and perfluoroalkyl carboxylate. Examples of the polyoxyalkylene ether polymer compound having a perfluoroalkyl ether group in the side chain include, but are not limited to, a sulfate of the polyoxyalkylene ether polymer having a perfluoroalkyl ether group in the side chain, and a salt of the polyoxyalkylene ether polymer having a perfluoroalkyl ether group in the side chain. Examples of counter ions of the salts in these fluorine-based surfactants include, but are not limited to, Li, Na, K, $NH_4$, $NH_3CH_2CH_2OH$, $NH_2(CH_2CH_2OH)_2$, and $NH(CH_2CH_2OH)_3$.

Examples of the amphoteric surfactant include, but are not limited to, laurylaminopropionate, lauryldimethyl betaine, stearyldimethyl betaine, and lauryldihydroxyethyl betaine.

Examples of the nonionic surfactant include, but are not limited to, polyoxyethylene alkyl phenyl ether, polyoxyethylene alkyl ester, polyoxyethylene alkyl amine, polyoxyethylene alkyl amide, polyoxyethylene propylene block polymer; sorbitan fatty acid ester, polyoxyethylene sorbitan fatty acid ester, and ethylene oxide-added acetylene alcohol.

Examples of the anionic surfactant include, but are not limited to, polyoxyethylene alkyl ether acetate, dodecylbenzene sulfonate, laurate, and polyoxyethylene alkyl ether sulfate. These may be used alone or in combination.

As the silicone-based surfactant, an appropriately synthesized surfactant, or a commercially available product may be used. The commercially available product is available from BYK Additives & Instruments GmbH, Shin-Etsu Chemical Co., Ltd., Dow Corning Toray Silicone Co Ltd., NIHON EMULSION Co., Ltd, KYOEISHA CHEMICAL CO., LTD., and the like.

The polyether-modified silicone-based surfactant is not particularly limited, and can be appropriately selected depending on the intended purpose. Examples of the polyether-modified silicone-based surfactant include, but are not limited to, a dimethylpolysiloxane in which a polyalkylene oxide structure is introduced to a side chain of an Si moiety, represented by general formula (S-1):

General formula (S-1)

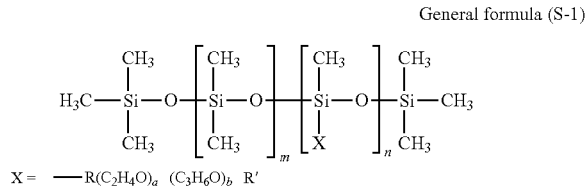

where each of m, n, a, and b independently represents an integer, R represents an alkylene group, and R' represents an alkyl group.)

For the polyether-modified silicone-based surfactant, a commercially available product can be used Examples of the commercially available product include, but are not limited to: KF-618, KF-642, and KF-643 (from Shin-Etsu Chemical Co., Ltd.); EMALEX SS-5602 and SS-1906 EX (from NIHON EMULSION Co., Ltd); FZ-2105, FZ-2118, FZ-2154, FZ-2161, FZ-2162, FZ-2163, and FZ-2164 (from Dow Corning Toray Silicone Co Ltd.); BY:K-33 and BYK-387 (from BYK Additives & Instruments GmbH); and TSF4440, TSF4452, and TSF4453 (GE Toshiba. Silicones Co., Ltd.).

The fluorine-based surfactant is preferably a fluorine-substituted compound having 2 to 16 carbon atoms, and more preferably a fluorine-substituted compound having 4 to 16 carbon atoms.

Examples of the fluorine-based surfactant include, but are not limited to, a perfluoroalkyl phosphate compound, a perfluoroalkyl ethylene oxide adduct, a polyoxyalkylene ether polymer compound having a perfluoroalkyl ether group in the side chain. Above all, the polyoxyalkylene ether polymer compound having a perfluoroalkyl ether group in the side chain is preferable because of low foamability, and in particular, fluorine-based surfactants represented by general formula (F-1) and general formula (F-2) are preferable.

General formula (F-1)

In the compound represented by general formula (F-1), m preferably represents an integer of 0 to 10, and a preferably represents an integer of 0 to 40, for imparting water solubility.

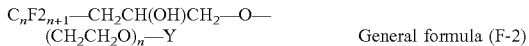

General formula (F-2)

In the compound represented by general formula (F-2), Y represents H, or $C_mF_{2m+1}$ where m represents an integer of 1 to 6, or $CH_2CH(OH)CH_2-C_mF_{2m+1}$ where m represents an integer of 4 to 6, or $(C_pH_{2p+1}$ where p represents an integer of 1 to 19; n represents an integer of 1 to 6; and a represents an integer of 4 to 14.

For the fluorine-based surfactant, a commercially available product may be used.

Examples of the commercially available product include, but are not limited to: SURFLON S-111, S-112, S-113, S-121, S-131, S-132, S-141 and S-145 (manufactured by AGC Inc.); FLUORAD FC-93, FC-95, FC-98, FC-129, FC-135, FC-170C, FC-430, and FC-431 (manufactured by 3M Japan Limited); MEGAFACE F-470, F-1405, and F-474, (manufactured by DIC Corporation); Zonyl TBS, FSP, FSA, FSN-100, FSN, FSO-100, FSO, FS-300, and UR, and Capstone FS-30, FS-31, FS-3100, FS-34, and FS-35 (manufactured by Chemours Company); FT-110, FT-250, FT-251, FT-400S, FT-150, and FT-400SW (manufactured by Neos Corporation); PolyFox PF-136A, PF-156A, PF-151N, PF-154, and PF-159 (manufactured by OMNOVA. Solutions Inc.); and UNIDYNE DSN-403N (manufactured by DAIKIN INDUSTRIES, LTD.,). Above all, FS-3100. FS-34, and FS-300 manufactured by Chemours Company, FT-110, FT-250, FT-251, FT-400S, FT-150, and FT-400SW manufactured by Neos Corporation, PolyFox PF-151N manufactured by OMNOVA Solutions Inc., and UNIDYNE DSN-403N manufactured by DAIKIN INDUSTRIES, LTD. are particularly preferable for good character printing quality, in particular, remarkably improved color developing property, permeability to paper, wettability, dyeing levelness.

A content of the surfactant in the ink is not particularly limited, and can be appropriately selected depending on the intended purpose. However, for excellent wettability and discharge stability, and improved image quality, the content is preferably 0.001% by mass to 5% by mass, and more preferably 0.05% by mass to 5% by mass.

<Antifoaming Agent>

The antifoaming agent is not particularly limited. Examples of the antifoaming agent include, but are not limited to, a silicone-based antifoaming agent, a polyether-based antifoaming agent, and a fatty acid ester-based antifoaming agent. These may be used alone or in combination. Above all, the silicone-based antifoaming agent is preferable for excellent foam breaking effect.

<Antiseptic and Antifungal Agent>

The antiseptic and antifungal agent is not particularly limited. Examples of the antiseptic and antifungal agent include, but are not limited to, 1,2-benzisothiazolin-3-one.

<Antirust Agent>

The antirust agent is not particularly limited. Examples of the antirust agent include, but are not limited to, acidic sulfite and sodium thiosulfate.

<pH Conditioner>

The pH conditioner is not particularly limited as long as the pH conditioner can adjust the ink to have a pH of 7 or higher. Examples of the pH conditioner include, but are not limited to, an amine such as diethanolamine and triethanolamine.

The physical properties of the ink are not particularly limited, and can be appropriately selected depending on the intended purpose. For example, viscosity, surface tension, pH, and the like are preferably within the following ranges.

The viscosity of the ink at 25° C. is preferably 5 mPa·s to 30 mPa·s, more preferably 5 mPa·s to 25 mPa·s, for improved character printing density and character quality, and good dischargeability. Herein, the viscosity can be measured using a rotary viscometer (RE-80L manufactured by TOKI SANGYO CO., LTD.). The measurement can be implemented under a measurement condition using a standard cone rotor (1° 34'×R24), with a sample liquid volume of 1.2 mL, at a rotation speed of 50 rpm and 25 degrees C., for 3 minutes.

The surface tension of the ink is preferably 35 mN/m or lower, and more preferably 32 mN/m or lower, at 25 degrees C., for suitably leveling the ink on the recording medium and shortening the time of drying the ink.

The pH of the ink is preferably 7 to 12, and more preferably 8 to 11, for preventing corrosion of a metal member in contact with the ink.

<Recording Medium>

The recording medium used for recording is not particularly limited. Examples of the recording medium include, but are not limited to, plain paper, glossy paper, special paper, cloth, film, OHP sheet, and general-purpose printing paper. In particular, the ink set according to the present disclosure is excellent in storage stability and can achieve high color developing property and high fastness property on a coated paper, a plastic film, and a textile medium.

<Recorded Matter>

The recorded matter of the present disclosure has an image formed using the ink of the present disclosure on the recording medium.

Recording can be carried out by an inkjet recording apparatus and an inkjet recording method to obtain the recorded matter.

<Recording Apparatus, and Recording Method>

The ink of the present disclosure can be suitably used for various recording apparatuses employing an inkjet recording method, e.g., a printer, a facsimile machine, a copier, a printer/facsimile/copier multifunction peripheral, and a solid object forming apparatus.

In the present disclosure, the recording apparatus and the recording method refer to an apparatus capable of discharging an ink and various treatment liquids to the recording medium and a method of making a recording using the apparatus, respectively. The recording medium refers to a medium which can be at least temporarily adhered with the ink and the various treatment liquids.

The recording apparatus may include not only a head portion configured to discharge the ink, but also devices associated with feed, conveyance, and ejection of the recording medium, and furthermore apparatuses called a pretreatment device and a posttreatment device.

The recording apparatus may have a heating device and a drying device respectively used in the heating step and the drying step in the recording method. The heating device and the drying device include respective devices for heating and drying the character-printed surface and the back surface of the recording medium. The heating device and the drying device are not particularly limited. For the heating device and the drying device, for example, a warm-air heater or an infrared heater can be used. Heating and drying can be carried out before, during, and after character printing.

In addition, the recording apparatus and the recording method are not limited to apparatuses and methods capable of visualizing meaningful images such as characters and graphics using the ink. For example, included are recording apparatuses and recording methods capable of forming a pattern such as a geometric pattern, and fabricating a three-dimensional image.

In addition, the recording apparatus includes both a serial type apparatus configured to move the discharging head and a line type apparatus configured not to move the discharging head, unless otherwise specified.

Furthermore, this recording apparatus includes not only a desktop type recording apparatus but also a wide type recording apparatus capable of printing on an A0 size recording medium, and a continuous sheet printer capable of using a continuous paper wound in a roll form as a recording medium.

An example of a recording apparatus will be described with reference to FIG. 1 or 2.

Figure 2:
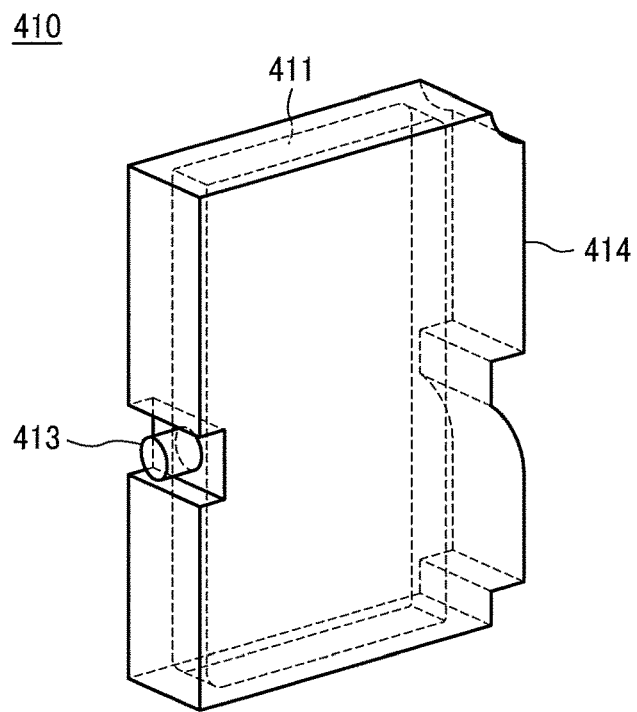
FIG. 2 is an explanatory perspective diagram of a main tank in the recording apparatus illustrated in FIG. 1.

FIG. 1 is an explanatory perspective view of the recording apparatus. FIG. 2 is an explanatory perspective view of a main tank. As an example of the recording apparatus, an image forming apparatus 400 is a serial type image forming apparatus. A mechanism unit 420 is disposed in an exterior 401 of the image forming apparatus 400. Each ink-storing unit 411 in each main tank 410 (410k, 410c, 410m, or 410y) for various colors of black (K), cyan (C), magenta (M), and yellow (Y) is formed of a packaging member such as an aluminum laminated film. The ink-storing unit 411 is accommodated in a container case 414 that may be made of plastic. Thereby, the main tank 410 is used as an ink cartridge for each color.

On the other hand, a cartridge holder 404 is disposed on the innermost side of the opening portion configured to appear by opening a cover 401c of the apparatus main body. The main tank 410 is detachably attached to the cartridge holder 404. Thereby, each ink discharging port 413 of the main tank 410 and a discharging head 434 for each color can communicate with each other via a feeding tube 436 for each color, to discharge the inks from the discharging head 434 to the recording medium.

The recording apparatus may include not only an ink-discharging unit, but also devices called a pretreatment device and a posttreatment device.

As an aspect for the pretreatment device and the posttreatment device, a liquid-storing unit containing a pretreatment liquid and a posttreatment liquid and a liquid discharging head are added, and the pretreatment liquid and the posttreatment liquid are discharged by an inkjet recording method, similarly to the cases of the inks of black (K), cyan (C), magenta (M), and yellow (Y).

As another aspect, a pretreatment device and a posttreatment device employing a method other than the inkjet recording method, e.g., a blade coating method, a roll coating method, or a spray coating method, may be disposed.

Incidentally, the method of using the ink is not limited to the inkjet recording method, and can be widely used. Examples the method other than the inkjet recording method include, but are not limited to, a blade coating method, a gravure coating method, a bar coating method, a roll coating method, a dip coating method, a curtain coating method, a slide coating method, a die coating method, and a spray coating method.

The application of the ink of the present disclosure is not particularly limited, and can be appropriately selected depending on the intended purpose. For example, the ink can be applied to a printed matter, a paint, a coating material, and a foundation. Also, the ink can be used as not only an ink for forming two-dimensional characters and images but also a solid object forming material for forming three-dimensional objects (solid objects).

As an apparatus for fabricating a solid object, a known apparatus including an ink-storing device, a feeding device, a discharging device, a drying device can be used, but the apparatus is not limited thereto. The solid objects include a solid object obtained by multi-coating with the ink. Also, included is a processed product obtained by processing a structure in which the ink is applied on a substrate such as a recording medium. The processed product is fabricated by, for example, heat-drawing and punching a recorded matter or a structure having a sheet-like form or film-like form. For example, the processed product is suitably used for applications in which gauges or operation panels of vehicles, office machines, electric and electronic machines, cameras or the like are built after decorating their surfaces.

In the present disclosure, all of the terms "image formation", "recording", "character printing", and "printing" are synonymous with each other.

All of the terms "recording medium", "medium", and "printed matter" are synonyms with each other.

EXAMPLES

Hereinafter, the present invention will be more specifically explained with reference to Examples and Comparative Examples. However, the present invention should not be construed to be limited to Examples and Comparative Examples. Note that the units "parts" and "%" in the following descriptions refer to "parts by mass" and "% by mass" respectively.

Hereinafter, a method for measuring the weight average molecular weight of the copolymer used in Examples and Comparative Examples will be explained.

<Measurement of Molecular Weight of Copolymer>

The molecular weights of the copolymers obtained in Examples and Comparative Examples were determined as follows.

Measurement was carried out by Gel Permeation Chromatography (GPC) under the following conditions.

Apparatus: GPC-8020 (manufactured by Tosoh Corporation)
Column: TSK G2000HXL and G4000HXL (manufactured by Tosoh Corporation)
Temperature: 40 degrees C.
Solvent: tetrahydrofuran (THF)
Flow rate: 1.0 mL/min 1 mL of copolymer in a concentration of 0.5% was injected into a column, and a weight average molecular weight Mw of the copolymer was calculated from a molecular weight distribution of the copolymer measured under the above conditions with reference to a molecular weight calibration curve drawn by means of a monodispersed polystyrene standard sample.

(Preparation of Urethane Resin Emulsion A)

To a four-necked flask equipped with a stirrer, a reflux cooling tube, a thermometer, and a nitrogen-blowing tube, 75 g of polycarbonate polyol (DURANOL T5651, manufactured by Asahi Kasei Chemicals Corporation) having an Mn of 1,000, 90 g of dicyclohexylmethane diisocyanate (H12MDI), and 200 g of acetone were added, reacted at 75 degrees C. for 4 hours to obtain an acetone solution of urethane prepolymer. This solution was cooled to 40 degrees C., to which 450 g of water was gradually added, and this solution was emulsified and dispersed using a homogenizer. Subsequently, an aqueous solution prepared by dissolving 15 g of 2-methyl-1,5-pentanediamine in 100 g of water was added to the solution, which continued to be stirred for 1 hour. From this solution, the solvent was removed under reduced pressure at 50 degrees C. to obtain an urethane resin emulsion A having a nonvolatile content of about 45%.

<Preparation of First Ink 1>

The following compounds were blended according to the following blending ratio, then mixed and stirred, and filtered with a 0.8 μm filter (Minisart, manufactured by Sartorius AG) to obtain a first ink 1.

1,2-propanediol: 10 parts
SURFYNOL 104: 1 part (acetylene glycol-based surfactant, manufactured by Nissin Chemical Co., Ltd.)
Calcium acetate monohydrate: 1.76 part
Urethane resin emulsion A: 22.2 parts
Proxel XL 11 (manufactured by Arch Chemicals Japan): 0.3 part
Ion exchanged water: remainder <Preparation of First Ink 2>

The following compounds were blended according to the following blending ratio, then mixed and stirred, and filtered with a 0.8 μm filter (Minisart, manufactured by Sartorius AG) to obtain a first ink 2.

1,2-propanediol: 10 parts
SURFYNOL 104: 1 part (acetylene glycol-based surfactant, manufactured by Nissin Chemical Co., Ltd.)
Calcium acetate monohydrate: 1.76 part
Proxel XL II (manufactured by Arch Chemicals Japan): 0.3 part
Ion exchanged water: remainder <Preparation of First Ink 3>

The following compounds were blended according to the following blending ratio, then mixed and stirred, and filtered with a 0.8 μm filter (Minisart, manufactured by Sartorius AG) to obtain a first ink 3.

1,2-propanediol: 10 parts
SURFYNOL 104: 1 part (acetylene glycol-based surfactant, manufactured by Nissin Chemical Co., Ltd.)
Urethane resin emulsion A: 22.2 parts
Proxel XL II (manufactured by Arch Chemicals Japan): 0.3 part
Ion exchanged water: remainder The formulation of the first ink is presented in Table 1.

TABLE 1

| First ink No. | Metal salt | Urethane resin emulsion |
|---|---|---|
| First ink 1 | Calcium acetate | A |
| First ink 2 | Calcium acetate | None |
| First ink 3 | None | A |

(Synthesis of Monomer (1))

24.8 g (210 mmol) of 1,6-hexanediol (manufactured by Tokyo Chemical Industry Co., Ltd.) was dissolved in 280 mL of methylene chloride, to which 8.3 g (105 mmol) of pyridine was added.

To this solution, a solution prepared by dissolving 20.0 g (105 mmol) of 2-naphthalenecarbonyl chloride (manufactured by Tokyo Chemical Industry Co., Ltd.) in 40 mL of methylene chloride was dripped while stirring for 2 hours, and then stirred at room temperature for 6 hours. The obtained reaction solution was washed with water, then the organic phase was isolated, dried with magnesium sulfate, and the solvent was distilled off. The residue was purified by silica gel column chromatography using a mixed solvent of methylene chloride/methanol (volume ratio: 98/2) as an eluent to obtain 21.0 g of a reaction intermediate (I-1) represented by the following structural formula (I-1).

Structural formula (I-1)

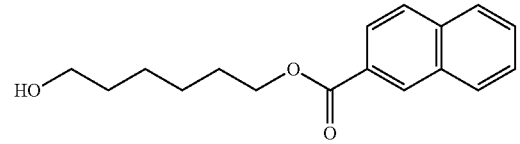

Subsequently, 16.8 g (62 mmol) of the reaction intermediate (I-1) was dissolved in 20 mL of dry methyl ethyl ketone, and heated to 60 degrees C. To this solution, a solution prepared by dissolving 9.6 g (62 mmol) of 2-methacryloyloxyethyl isocyanate (Karenz MOI, manufactured by SHOWA DENKO K. K.) in 20 mL of dry methyl ethyl ketone was dripped while stirring for 1 hour, and then stirred at 70 degrees C. for 12 hours. The solution was cooled to room temperature, and then the solvent was distilled off. The residue was purified by silica gel column chromatography using a mixed solvent of methylene chloride/methanol (volume ratio: 99/1) as an eluent to obtain 22.8 g of a monomer (1) represented by the following structural formula.

Monomer (1)

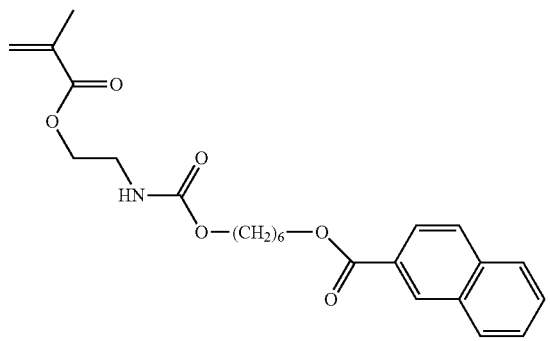

(Synthesis of Monomer (2))

A monomer (2) represented by the following structural formula was obtained in the same manner as the synthesis of the monomer (1) except that 1,12-dodecanediol (manufactured by Tokyo Chemical Industry Co., Ltd.) was used instead of 1,6-hexanediol.

Monomer (2)

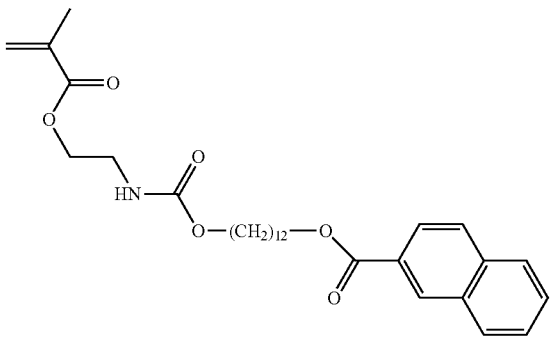

(Synthesis of Monomer (3))

A monomer (3) represented by the following structural formula was obtained in the same manner as the synthesis of the monomer (1) except that ethylene glycol (manufactured by Tokyo Chemical Industry Co., Ltd.) was used instead of 1,6-hexanediol.

Monomer (3)

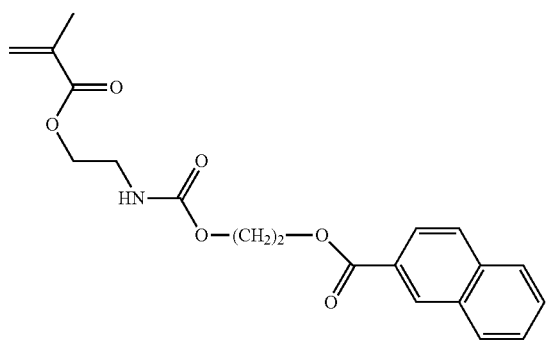

(Synthesis of Monomer (4))

16.8 g (62 mmol) of the reaction intermediate (I-1) was dissolved in 100 mL of methylene chloride, to which 8.0 g (79.2 mmol) of trimethylamine (manufactured by Tokyo Chemical Industry Co., Ltd.) was added. This solution was cooled in an ice bath, to which 8.0 g (76.4 mmol) of methacrylic acid chloride (manufactured by Tokyo Chemical Industry Co., Ltd.) was dripped for 30 minutes, then stirred in an ice bath for 1 hour, and at room temperature for 3 hours. The precipitate was filtered off, and the filtrate was washed with water, saturated sodium bicarbonate aqueous solution, and saturated brine, then the organic phase was isolated, dried with magnesium sulfate, and the solvent was distilled off. The residue was purified by silica gel column chromatography using a mixed solvent of n-hexane/ethyl acetate (volume ratio: 6/1) as an eluent to obtain 15.8 g of a monomer (4) represented by the following structural formula.

Monomer (4)

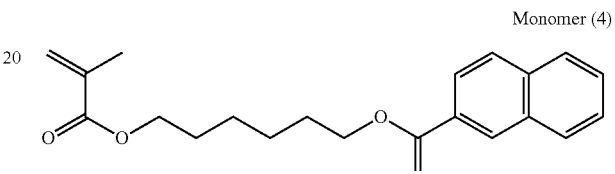

(Synthesis of Monomer (5))

60.0 g (0.50 mol) of 1,6-hexanediol and 20.0 g (0.107 mol) of 1-naphthaleneacetic acid (manufactured by Tokyo Chemical Industry Co., Ltd.) were put into a reactor, and dissolved by heating them to 70 degrees C. while stirring, To the solution, 0.52 g of concentrated sulfuric acid was added, and stirred at 70 degrees C. for 2 hours. The solution was cooled to room temperature, and washed by adding a solution prepared by dissolving 0.42 g of sodium hydroxide in 150 mL of water. The organic phase was extracted by adding 200 mL of ethyl acetate, and then further washed with water. The organic phase was isolated, dried with magnesium sulfate, and the solvent was distilled off. The residue was purified by silica gel column chromatography using a mixed solvent of n-hexane/ethyl acetate (volume ratio: 3/2) as an eluent to obtain 24.6 g of a reaction intermediate (I-2) represented by the following structural formula (I-2).

Structural formula (I-2)

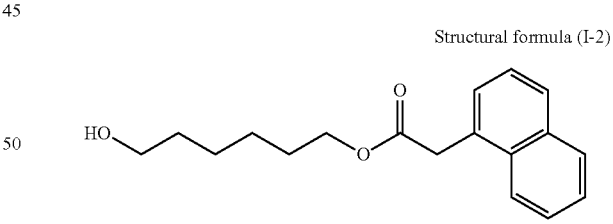

Subsequently, 17.2 g (60 mmol) of the reaction intermediate (I-2) was dissolved in 100 mL of methylene chloride, to which 80 g (79.2 mmol) of trimethylamine (manufactured by Tokyo Chemical Industry Co., Ltd.) was added. This solution was cooled in an ice bath, to which 7.0 g (76.8 mmol) of acrylic acid chloride (manufactured by Tokyo Chemical Industry Co., Ltd.) was dripped for 30 minutes, then stirred in an ice bath for 1 hour, and at room temperature for 3 hours. The precipitate was filtered off, and the filtrate was washed with water, saturated sodium bicarbonate aqueous solution, and saturated brine, then the organic phase was isolated, dried with magnesium sulfate, and the solvent was distilled off. The residue was purified by silica gel column chromatography using a mixed solvent of n-hexane/ethyl acetate (volume ratio: 7/1) as an eluent to obtain 15.0 g of a monomer (5) represented by the following structural formula.

Monomer (5)

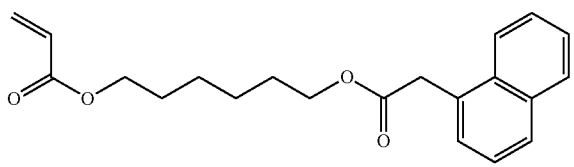

(Synthesis of Monomer (6))

48.0 g (320 mmol) of triethylene glycol (manufactured by Tokyo Chemical Industry Co., Ltd.) and 14.9 g (80 mmol) of 1-naphthaleneacetic acid were put into a reactor, and dissolved by heating them to 70 degrees C. while stirring. To the solution, 0.36 g of concentrated sulfuric acid was added, and stirred at 70 degrees C. for 2 hours. The solution was cooled to room temperature, and washed by adding a solution prepared by dissolving 0.32 g of sodium hydroxide in 200 mL of water. The organic phase was extracted by adding 160 mL of ethyl acetate, and then further washed with water. The organic phase was isolated, dried with magnesium sulfate, and the solvent was distilled off. The residue was purified by silica gel column chromatography using a mixed solvent of methylene chloride/methanol (volume ratio: 19/1) to obtain 19.5 g of a reaction intermediate (I-3) represented by the following structural formula (I-3).

Structural formula (I-3)

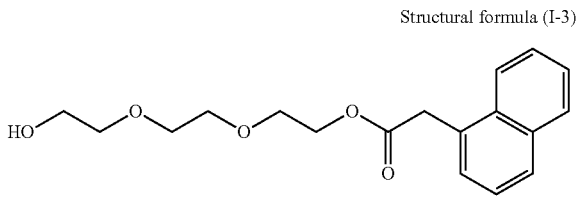 [SMILES: O=C(Cc1cccc2ccccc12)OCCOCCOCCO]

Subsequently 12.5 g (40 mmol) of the reaction intermediate (I-3) was dissolved in 80 mL of methylene chloride, to which 5.64 g (56 mmol) of trimethylamine (manufactured by Tokyo Chemical Industry Co., Ltd.) was added. This solution was cooled in an ice bath, to which 5.04 g (56 mmol) of acrylic acid chloride (manufactured by Tokyo Chemical Industry Co., Ltd.) was dripped for 30 minutes, then stirred in an ice bath for 1 hour, and at room temperature for 3 hours. The precipitate was filtered off, and the filtrate was washed with, water, saturated sodium bicarbonate aqueous solution, and saturated brine, then the organic phase was isolated, dried with magnesium sulfate, and the solvent was distilled off. The residue was purified by silica gel column chromatography using a mixed solvent of n-hexane/ethyl acetate (volume ratio: 3/2) as an eluent to obtain 12.2 g of a monomer (6) represented by the following structural formula.

Monomer (6)

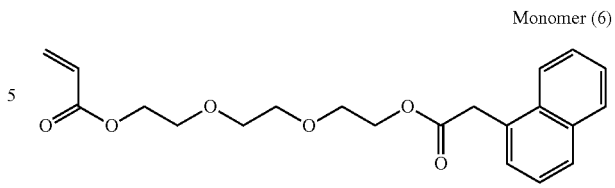

(Synthesis of Monomer (7))

32.6 g (168 mmol) of tetraethylene glycol (manufactured by Tokyo Chemical Industry Co., Ltd.) was dissolved, in 360 mL of methylene chloride, to which 6.64 g (82 mmol) of pyridine was added.

To this solution, a solution prepared by dissolving 16.0 g (84 mmol) of 2-naphthalenecarbonyl chloride (manufactured by Tokyo Chemical Industry Co., Ltd.) in 40 mL of methylene chloride was dripped while stirring for 2 hours, and then stirred at room temperature for 6 hours. The obtained reaction solution was washed with water, then the organic phase was isolated, dried with magnesium sulfate, and the solvent was distilled off. The residue was purified by silica gel column chromatography using a mixed solvent of methylene chloride/methanol (volume ratio: 19/1) as an eluent to obtain 15.9 g of a reaction intermediate (I-4) represented by the following structural formula (I-4).

Structural formula (I-4)

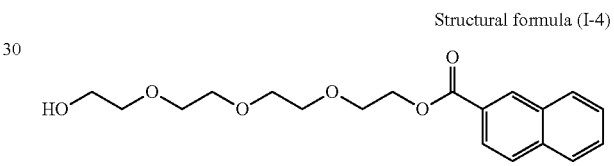

Subsequently, 14.6 g (40.8 mmol) of the reaction intermediate (I-4) was dissolved in 240 mL of methylene chloride, to which 7.4 g (73.2 mmol) of trimethylamine (manufactured by Tokyo Chemical Industry Co., Ltd.) was added. This solution was cooled in an ice bath, to which 6.16 g (59.2 mmol) of methacrylic acid chloride (manufactured by Tokyo Chemical industry Co, Ltd.) was dripped for 30 minutes, then stirred in an ice bath for 1 hour, and at room temperature for 3 hours. The precipitate was filtered off, and the filtrate was washed with water, saturated sodium bicarbonate aqueous solution, and saturated brine, then the organic phase was isolated, dried with magnesium sulfate, and the solvent was distilled off. The residue was purified by silica gel column chromatography using a mixed solvent of n-hexane/ethyl acetate (volume ratio: 3/2) as an eluent to obtain 15.3 g of a monomer (7) represented by the following structural formula.

Monomer (7)

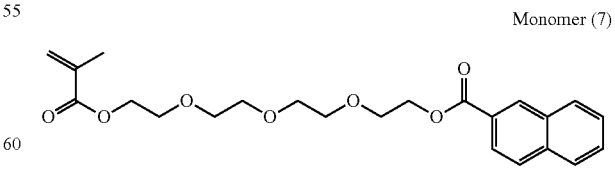

(Synthesis of Monomer (8))

46.5 g (210 mmol) of 1,10-diaminohexane (manufactured by Tokyo Chemical Industry Co., Ltd.) was dissolved in 280 mL, of methylene chloride, to which 8.3 g (105 mmol) of pyridine was added.

To this solution, a solution prepared by dissolving 20.0 g (105 mmol) of 2-naphthalenecarbonyl chloride (manufactured by Tokyo Chemical Industry Co., Ltd.) in 40 mL of methylene chloride was dripped while stirring for 2 hours, and then stirred at room temperature for 6 hours. The obtained reaction solution was washed with water, then the organic phase was isolated, dried with magnesium sulfate, and the solvent was distilled off. The residue was purified by silica gel column chromatography using a mixed solvent of methylene chloride/methanol (volume ratio: 98/2) as an eluent to obtain 20.9 g of a reaction intermediate (I-5) represented by the following structural formula (I-5).

Structural formula (I-5)

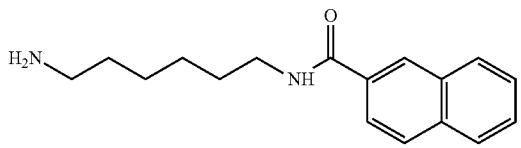

Subsequently, 16.7 g (62 mmol) of the reaction intermediate (I-5) was dissolved in 20 mL of dry methyl ethyl ketone, and heated to 60 degrees C. To this solution, a solution prepared by dissolving 9.6 g (62 mmol) of 2-methacryloyloxyethyl isocyanate (Karenz MOI, manufactured by SHOWA DENKO K.K.) in 20 mL of dry methyl ethyl ketone was dripped while stirring for 1 hour, and then stirred at 70 degrees C. for 12 hours. The solution was cooled to room temperature, and then the solvent was distilled off. The residue was purified by silica gel column chromatography using a mixed solvent of methylene chloride/methanol (volume ratio: 99/1) as an eluent to obtain 22.7 g of a monomer (8) represented by the following structural formula (8).

Monomer (8)

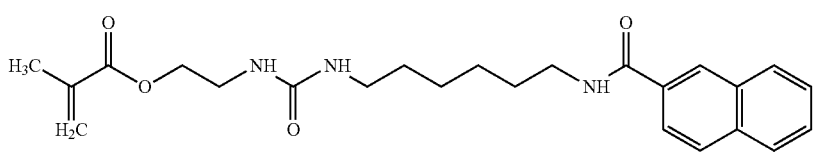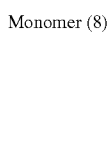

(Synthesis of Copolymer 1)

A monomer solution was prepared by dissolving 1.80 g (25.0 mmol) of acrylic acid (manufactured by Sigma-Aldrich Co. LLC) and 8.51 g (25.0 mmol) of monomer (1) in 16 mL, of dry methyl ethyl ketone. A tenth part of the monomer solution was heated to 75 degrees C. in an argon gas stream, and then, to the remaining monomer solution, a solution containing 0.410 g (2.50 mmol) of 2,2'-azoiso (butyronitrile) (manufactured by Tokyo Chemical. Industry Co., Ltd.) was dripped for 1.5 hour, which was stirred at 75 degrees C. for 6 hours. The solution was cooled to room temperature, and the obtained reaction solution was added to hexane. The precipitated copolymer was filtered out, and dried, under reduced pressure to obtain 12.2 g of copolymer 1 (weight average molecular weight (Mw): 9,400).

(Synthesis of Copolymer 2)

A copolymer 2 (weight average molecular weight (Mw): 23,000) was obtained in the same manner as the synthesis of the copolymer 1 except that the monomer (2) was used instead of the monomer (1) in the synthesis of the copolymer 1.

(Synthesis of Copolymer 3)

A copolymer 3 (weight average molecular weight (Mw): 19,000) was obtained in the same manner as the synthesis of the copolymer 1 except that the monomer (3) was used instead of the monomer (1) in the synthesis of the copolymer 1.

(Synthesis of Copolymer 4)

A copolymer 4 (weight average molecular weight: (Mw): 22,400) was obtained in the same manner as the synthesis of the copolymer 1 except that the monomer (4) was used instead of the monomer (1) in the synthesis of the copolymer 1.

(Synthesis of Copolymer 5)

A copolymer 5 (weight average molecular weight (Mw): 26,200) was obtained in the same manner as the synthesis of the copolymer 1 except that the monomer (5) was used instead of the monomer (1) in the synthesis of the copolymer 1.

(Synthesis of Copolymer 6)

A copolymer 6 (weight average molecular weight (Mw): 20,000) was obtained in the same manner as the synthesis of the copolymer 1 except that the monomer (6) was used instead of the monomer (1) in the synthesis of the copolymer 1.

(Synthesis of Copolymer 7)

A copolymer 7 (weight average molecular weight (Mw): 32,000) was obtained in the same manner as the synthesis of the copolymer 1 except that the monomer (7) was used instead of the monomer (1) in the synthesis of the copolymer 1.

(Synthesis of Copolymer 8)

A copolymer 8 (weight average molecular weight (Mw): 20,000) was obtained in the same manner as the synthesis of the copolymer 1 except that the monomer (8) was used instead of the monomer (1) in the synthesis of the copolymer 1.

Subsequently, 2.00 g of each of the obtained copolymer was dissolved in an aqueous solution of tetraethylammonium hydroxide so that the solution has a copolymer concentration of 2.38% and a pH value of 8.0, to prepare each pigment dispersing aqueous solution of copolymers 1 to 8.

(Preparation of Copolymer 9)

A copolymer 9 (weight average molecular weight (Mw): 7,500, number average molecular weight (Mn): 2,800) was obtained in the same manner as the synthesis of the copolymer 1 except that a monomer (9) having a structure represented by the following structural formula was used instead of the monomer (1) in the synthesis of the copolymer 1.

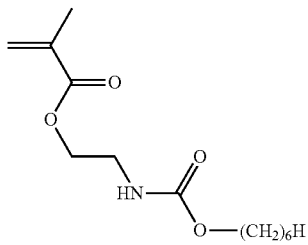

Monomer (9)

Subsequently 2.00 g of the obtained copolymer was dissolved in an aqueous solution of tetraethylammonium hydroxide so that the solution has a copolymer concentration of 238% and a pH value of 8.0, to prepare a pigment dispersing aqueous solution of copolymer 9.

(Preparation of Copolymer 10)

A monomer solution was prepared by dissolving 0.75 g (7.18 mmol) of styrene (manufactured by Tokyo Chemical Industry Co., Ltd.), 7.65 g (6.86 mmol) of PME-1000 (manufactured by NOF CORPORATION), and 16.3 g (48.0 mmol) of monomer (1) in 260 mL of dry methyl ethyl ketone. A tenth part of the monomer solution was heated to 80 degrees C. in an argon gas stream, and then, to the remaining monomer solution, a solution containing 0,273 g (1.67 mmol) of 2,2'-azoiso(butyronitrile) (manufactured by Tokyo Chemical Industry Co., Ltd.) was dripped for 1.5 hour, which was stirred at 75 degrees C. for 6 hours. The solution was cooled to room temperature, and the obtained reaction solution was added to hexane. The precipitated copolymer was filtered out, and dried under reduced pressure to obtain 24.6 g of copolymer 10 (weight average molecular weight (Mw): 18,000).

Subsequently, 2.00 g of the obtained copolymer was dissolved in an aqueous solution of tetraethylammonium hydroxide so that the solution has a copolymer concentration of 2.38% and a pH value of 8.0, to prepare a pigment dispersing aqueous solution of copolymer 10.

(Preparation of Pigment Dispersion 1)

To 84.0 parts of the copolymer 1 aqueous solution, 16.0 parts of carbon black (NIPEX 150, manufactured by Degussa AG) was added, and stirred for 12 hours. The obtained mixture was cyclically dispersed using a disc type bead mill (KDL type, manufactured by Shinmaru Enterprises Corporation, media: zirconia ball with a diameter of 0.1 mm) at a cycle rate of 10 m/s for 1 hour, and then filtered with a membrane filter having a pore size of 1.2 μm, to which an adjusted amount of ion exchanged water was added to obtain 95.0 parts of a pigment dispersion 1 (concentration of a pigment solid content: 16%).

(Preparation of Pigment Dispersions 2 to 10)

Pigment dispersions 2 to 10 were obtained in the same manner as for the pigment dispersion 1 except that aqueous solutions of the copolymers 2 to 10, respectively, were used instead of the aqueous solution of the copolymer 1 in the preparation of the pigment dispersion 1.

The compositions of the pigment dispersions are presented in the following Table 2.

TABLE 2

| Pigment dispersion | Copolymer No. | Components of copolymer | |
|---|---|---|---|
| | | Monomer A | Monomer B |
| Pigment dispersion 1 | Copolymer 1 | Monomer 1 | Monomer constituting the structural unit represented by general formula (1) |
| Pigment dispersion 2 | Copolymer 2 | Monomer 2 | Monomer constituting the structural unit represented by general formula (2) |
| Pigment dispersion 3 | Copolymer 3 | Monomer 3 | the structural unit represented by general formula (3) (acrylic acid) |
| Pigment dispersion 4 | Copolymer 4 | Monomer 4 | |
| Pigment dispersion 5 | Copolymer 5 | Monomer 5 | |
| Pigment dispersion 6 | Copolymer 6 | Monomer 6 | |
| Pigment dispersion 7 | Copolymer 7 | Monomer 7 | |
| Pigment dispersion 8 | Copolymer 8 | Monomer 8 | |
| Pigment dispersion 9 | Copolymer 9 | Monomer 9 | Comparative monomer |
| Pigment dispersion 10 | Copolymer 10 | Monomer 1 | Monomer constituting the structural unit represented by general formula (1) | PME-1000/ styrene |

(Preparation of Urethane Resin Emulsion B)

To a four-necked flask equipped with a stirrer, a reflux cooling tube, a thermometer, and a nitrogen-blowing tube, 150 g of polycarbonate polyol (DURANOL T5651, manufactured by Asahi Kasei Chemicals Corporation) having a Mn of 1,000, 20.0 g of dimethylol propionic acid, 120 g of dicyclohexylmethane diisocyanate (H12MDI), and 270 g of acetone were added, reacted at 75 degrees C. for 4 hours to obtain an acetone solution of urethane prepolymer. This solution was cooled to 40 degrees C., and neutralized by adding 15 g of triethylamine to this solution, to which 900 g of water was gradually added, and this solution was emulsified and dispersed using a homogenizer. Subsequently, an aqueous solution prepared by dissolving 15 g of 2-methyl-1,5-pentanediamine in 100 g of water was added to the solution, which continued to be stirred for 1 hour. From this solution, the solvent was removed under reduced pressure at 50 degrees C. to obtain an urethane resin emulsion B having a nonvolatile content of about 26%.

(Preparation of Urethane Resin Emulsion C)

To a four-necked flask equipped with a stirrer, a reflux cooling tube, a thermometer, and a nitrogen-blowing tube, 75 g of polycarbonate polyol (DURANOL T5650E, manufactured by Asahi Kasei Chemicals Corporation) having a Mn of 500, 20.0 g of dimethylol propionic acid, 120 g of dicyclohexylmethane diisocyanate (H12MDI), and 270 g of acetone were added, reacted at 75 degrees C. for 4 hours to obtain an acetone solution of urethane prepolymer. This solution was cooled to 40 degrees C., and neutralized by adding 15 g of triethylamine to this solution, to which 900 g of water was gradually added, and this solution was emulsified and dispersed using a homogenizer. Subsequently, an aqueous solution prepared by dissolving 15 g of 2-methyl-1,5-pentanediamine in 100 g of water was added to the solution, which continued to be stirred for 1 hour. From this solution, the solvent was removed under reduced pressure at 50 degrees C. to obtain an urethane resin emulsion C having a nonvolatile content of about 21%.

(Preparation of Urethane Resin Emulsion D)

To a four-necked flask equipped with a stirrer, a reflux cooling tube, a thermometer, and a nitrogen-blowing tube, 75 g of polycarbonate polyol (DURANOL T5650E, manufactured by Asahi Kasei Chemicals Corporation) having a Mn of 500, 20.0 g of dimethylol propionic acid, 120 g of dicyclohexylmethane diisocyanate (H12MDI), and 270 g of acetone were added, reacted at 75 degrees C. for 4 hours to obtain an acetone solution of urethane prepolymer. This solution was cooled to 40 degrees C., and neutralized by adding 15 g of triethylamine to this solution, to which 900 g of water was gradually added, and this solution was emulsified and dispersed using a homogenizer. Subsequently, an aqueous solution prepared by dissolving 8 g of diethylenetriamine in 100 g of water was added to the solution, which continued to be stirred for 1 hour. From this solution, the solvent was removed under reduced pressure at 50 degrees C. to obtain an urethane resin emulsion D having a nonvolatile content of about 21%.

(Preparation of Acrylic Resin Emulsion A)

A mixture including 48.4 g of styrene, 58.3 g of 2-ethylhexyl acrylate, 1.5 g of Aqualon HS-10 (manufactured by DKS Co. Ltd.), and 55 g of ion exchanged water was emulsified using a homomixer to obtain a homogeneous milky white emulsion.

Into a 1 L flask equipped with a stirrer, a thermometer, a nitrogen-blowing tube, and a reflux tube, 96 g of water at pH 3 previously prepared with ion exchanged water and sulfuric acid was charged, and heated to 70 degrees C. while introducing nitrogen into the flask.

Subsequently, 3.1 g of 10% Aqualon HS-10 (manufactured by DKS Co. Ltd.) aqueous solution as a reactive emulsifier, and 3.0 g of 5% ammonium persulfate aqueous solution were added to the flask, to which the previously prepared emulsion was continuously dripped for 2.5 hours.

In addition, 0.7 g of a 5% ammonium persulfate aqueous solution was added to the flask at 1-hour intervals, for 3 hours after the onset of the dripping.

After the completion of the dripping, the solution was matured at 70 degrees C. for 2 hours, then cooled, and adjusted to pH 7 to 8 with sodium hydroxide aqueous solution to obtain an acrylic resin emulsion A.

<Preparation of Second Ink 1>
Pigment Dispersion 1: 30.0 parts
Urethane Resin Emulsion B: 20.0 parts
1,3-butanediol: 15 parts
Glycerin: 15.0 parts
SURFYNOL 104: 0.9 part (acetylene glycol-based surfactant, manufactured by Nissin Chemical Co., Ltd.)
2-amino-2-ethyl-1,3-propanediol: 0.5 part
Proxel XL II (manufactured by Arch Chemicals Japan): 0.3 part
Ion exchanged water: remainder Materials in the above-described formulation other than the pigment dispersion 1 and the urethane resin emulsion B were dissolved in ion exchanged water to prepare a vehicle. Then the vehicle was mixed with the urethane resin emulsion B and finally mixed with the pigment dispersion 1, and filtered with a filter having an average pore size of 0.8 µm to obtain an ink 1.

As a result of measuring a storage modulus G' of a dried film of the obtained ink 1, the storage modulus G' was $2.3 \times 10^7$.

<Preparation of Second Inks 2 to 13>

Inks 2 to 13 were obtained in the same manner as for the ink 1, except that one or both of the pigment dispersion 1 and the urethane resin emulsion B in the ink 1 were changed to the combinations presented in Table 3.

The storage modulus G' and the storage stabilities of the dried ink films of the obtained inks 2 to 13 are as presented in Table 3.

<Storage Stability>

5 g of the second ink was put into LABORAN screw tube bottle No. 3 (manufactured by AS ONE Corporation), which was stored in a thermostat set at 70 degrees C. for one week, and a rate of the viscosity change was calculated from the viscosities of the ink before and after the storage to evaluate the ink according to the following criteria.

Rate of viscosity change=100×(viscosity at 70 degrees C. after one week−initial viscosity)/ initial viscosity [%]

[Evaluation Criteria]
Good: Rate of viscosity change was less than ±10%
Medium: Rate of viscosity change was ±10% or more and less than ±30%
Bad: Rate of viscosity change was ±30% or more

TABLE 3

| First ink | Metal salt | Urethane | Second ink | Monomer | Other monomer | Copolymer | Pigment dispersion | Urethane resin emulsion | G' (Pa) at 25° C. | Storage stability |
|---|---|---|---|---|---|---|---|---|---|---|
| First ink 1 | Calcium acetate | A | Second ink 1 | Monomer 1 | AA | Copolymer 1 | Pigment dispersion 1 | Urethane resin emulsion B | 2.2 × 10⁷ | Good |
| First ink 1 | Calcium acetate | A | Second ink 2 | Monomer 2 | AA | Copolymer 2 | Pigment dispersion 2 | Urethane resin emulsion B | 2.3 × 10⁷ | Good |
| First ink 1 | Calcium acetate | A | Second ink 3 | Monomer 3 | AA | Copolymer 3 | Pigment dispersion 3 | Urethane resin emulsion B | 2.2 × 10⁷ | Good |
| First ink 1 | Calcium acetate | A | Second ink 4 | Monomer 4 | AA | Copolymer 4 | Pigment dispersion 4 | Urethane resin emulsion B | 2.6 × 10⁷ | Medium |
| First ink 1 | Calcium acetate | A | Second ink 5 | Monomer 5 | AA | Copolymer 5 | Pigment dispersion 5 | Urethane resin emulsion B | 2.3 × 10⁷ | Medium |
| First ink 1 | Calcium acetate | A | Second ink 6 | Monomer 6 | AA | Copolymer 6 | Pigment dispersion 6 | Urethane resin emulsion B | 2.4 × 10⁷ | Medium |
| First ink 1 | Calcium acetate | A | Second ink 7 | Monomer 7 | AA | Copolymer 7 | Pigment dispersion 7 | Urethane resin emulsion B | 2.3 × 10⁷ | Medium |
| First ink 1 | Calcium acetate | A | Second ink 8 | Monomer 8 | AA | Copolymer 8 | Pigment dispersion 8 | Urethane resin emulsion B | 2.0 × 10⁷ | Medium |
| First ink 1 | Calcium acetate | A | Second ink 9 | Naphthyl-less | AA | Copolymer 9 | Pigment dispersion 9 | Urethane resin emulsion B | 2.4 × 10⁷ | Good |
| First ink 1 | Calcium acetate | A | Second ink 10 | Monomer 1 | Styrene, PME-1000 | Copolymer 10 | Pigment dispersion 10 | Urethane resin emulsion B | 2.2 × 10⁷ | Good |
| First ink 1 | Calcium acetate | A | Second ink 11 | Monomer 1 | AA | Copolymer 1 | Pigment dispersion 1 | Urethane resin emulsion C | 6.7 × 10⁷ | Good |
| First ink 1 | Calcium acetate | A | Second ink 12 | Monomer 1 | AA | Copolymer 1 | Pigment dispersion 1 | Urethane resin emulsion D | 7.3 × 10⁷ | Good |

TABLE 3-continued

| First ink | Metal salt | Urethane | Second ink | Monomer | Other monomer | Copolymer | Pigment dispersion | Urethane resin emulsion | G' (Pa) at 25° C. | Storage stability |
|---|---|---|---|---|---|---|---|---|---|---|
| First ink 2 | Calcium acetate | None | Second ink 1 | Monomer 1 | AA | Copolymer 1 | Pigment dispersion 1 | Urethane resin emulsion B | $2.3 \times 10^7$ | Good |
| First ink 1 | Calcium acetate | A | Second ink 13 | Monomer 1 | AA | Copolymer 1 | Pigment dispersion 1 | Urethane resin emulsion A | $1.1 \times 10^8$ | Medium |
| First ink 3 | None | A | Second ink 1 | Monomer 1 | AA | Copolymer 1 | Pigment dispersion 1 | Urethane resin emulsion B | $2.3 \times 10^7$ | Good |
| First ink 3 | None | A | Second ink 9 | Naphthyl-less | AA | Copolymer 9 | Pigment dispersion 9 | Urethane resin emulsion B | $2.4 \times 10^7$ | Medium |

(Ink Sets 1 to 16)

Ink sets of combinations presented in Table 4 were prepared, composed of the first inks 1 to 3 and the second inks 1 to 13.

TABLE 4

| Ink set | First ink | Second ink |
|---|---|---|
| Ink set 1 | First ink 1 | Second ink 1 |
| Ink set 2 | First ink 1 | Second ink 2 |
| Ink set 3 | First ink 1 | Second ink 3 |
| Ink set 4 | First ink 1 | Second ink 4 |
| Ink set 5 | First ink 1 | Second ink 5 |
| Ink set 6 | First ink 1 | Second ink 6 |
| Ink set 7 | First ink 1 | Second ink 7 |
| Ink set 8 | First ink 1 | Second ink 8 |
| Ink set 9 | First ink 1 | Second ink 9 |
| Ink set 10 | First ink 1 | Second ink 10 |
| Ink set 11 | First ink 1 | Second ink 11 |
| Ink set 12 | First ink 1 | Second ink 12 |
| Ink set 13 | First ink 2 | Second ink 1 |
| Ink set 14 | First ink 1 | Second ink 13 |
| Ink set 15 | First ink 3 | Second ink 1 |
| Ink set 16 | First ink 3 | Second ink 9 |

Characteristics of Examples 1 to 13 and Comparative Examples 1 to 3 were evaluated as follows. The results are summarized in Table 5.

<Evaluation of Image Density>

The ink sets of Examples and Comparative Examples were charged into Ri 100 manufactured by Ricoh Co., Ltd., and adjusted so that an adhesion amount of the first ink was 1.6 mg/cm² and the adhesion amount of the second ink was 1.9 mg/cm², then solid printing was applied on a polyester textile manufactured by TOMS CO., LTD. with the first ink and subsequently with the second ink at 600×600 dpi, then the inks were dried at 165 degrees C. for 90 seconds to obtain samples. Solid portions of the samples were measured, and evaluated according to the following criteria. "Excellent" and "Good" fall under an acceptable range.

[Evaluation Criteria]
Excellent: Image density of 1.3 or higher
Good: Image density of 1.20 or higher and lower than 1.3
Medium: Image density of 1.1 or higher and lower than 1.20
Bad: Image density of lower than 1.1

<Friction Fastness Property Test>

The obtained solid image was subjected to a friction fastness test (dry friction) using a color fastness rubbing tester according to Japanese Industrial Standards (JIS) JIS L0849, an OD of the image transferred to cotton fabric was colorimetrically measured to evaluate a friction fatness property based on the following evaluation criteria. "Excellent" and "Good" fall under an acceptable range.

[Evaluation Criteria]
Dry Friction
Excellent: OD of the image transferred to cotton fabric after the test was lower than 0.15
Good: OD of the image transferred to cotton fabric after the test was 0.15 or higher and lower than 0.20
Bad: OD of the image transferred to cotton fabric after the test was 0.20 or higher <Image Washing Fastness Property on Textile Media>

In a washing fastness test according to AATCC 61 2A, the image washing fastness property was evaluated based on the following evaluation criteria. "Medium", "Good", and "Excellent" fall under an acceptable range.

[Evaluation Criteria]
Excellent: Image at grade 4.5 or higher
Good: Image at grade 4.0
Medium: Image at grade 3.5
Bad: Image at grade 3.0 or lower

TABLE 5

| Embodiments | | | Evaluation results | | |
|---|---|---|---|---|---|
| | Ink set | Recording medium | Image density | Dry friction | Washing Fastness Property |
| Example 1 | Ink set 1 | Polyester | Excellent | Excellent | Excellent |
| Example 2 | Ink set 2 | Polyester | Excellent | Excellent | Excellent |
| Example 3 | Ink set 3 | Polyester | Excellent | Excellent | Excellent |
| Example 4 | Ink set 4 | Polyester | Excellent | Excellent | Excellent |
| Example 5 | Ink set 5 | Polyester | Excellent | Excellent | Excellent |
| Example 6 | Ink set 6 | Polyester | Excellent | Excellent | Excellent |
| Example 7 | Ink set 7 | Polyester | Excellent | Excellent | Excellent |
| Example 8 | Ink set 8 | Polyester | Excellent | Excellent | Excellent |
| Example 9 | Ink set 10 | Polyester | Good | Excellent | Excellent |
| Example 10 | Ink set 11 | Polyester | Excellent | Excellent | Good |
| Example 11 | Ink set 12 | Polyester | Excellent | Good | Good |
| Example 12 | Ink set 13 | Polyester | Excellent | Good | Medium |
| Example 13 | Ink set 14 | Polyester | Excellent | Good | Medium |
| Comparative Example 1 | Ink set 9 | Polyester | Medium | Excellent | Excellent |
| Comparative Example 2 | Ink set 15 | Polyester | Medium | Excellent | Excellent |
| Comparative Example 3 | Ink set 16 | Polyester | Bad | Excellent | Excellent |

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:
1. An ink set comprising:
   a first ink containing a polyvalent metal ion; and
   a second ink containing a copolymer having a structural unit represented by the following general formula (1);

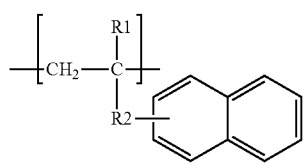

General formula (1)

wherein R1 represents hydrogen atom or a methyl group, and R2 represents one linking group or a combination of two or more linking groups selected from a group consisting of the following linking groups;
—COO—, —OCO—, —O—, —NHCONH—, NR3CO— (R3 represents hydrogen atom or an alkyl group having 1 to 6 carbon atoms), an alkylene group having 1 to 12 carbon atoms, an alkyl ether group having 1 to 12 carbon atoms, and —NR4- (R4 represents hydrogen atom or an alkyl group having 1 to 6 carbon atoms).

2. The ink set according to claim 1, wherein the structural unit represented by general formula (1) is a structural unit represented by the following general formula (2):

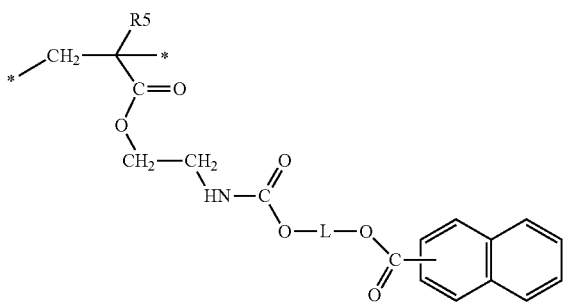

General formula (2)

wherein R5 represents hydrogen atom or a methyl group, and L represents a single bond or an alkylene group having 2 to 18 carbon atoms.

3. The ink set according to claim 1, wherein the copolymer further has a structural unit represented by the following general formula (3):

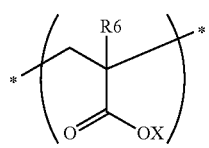

General formula (3)

wherein R6 represents hydrogen atom or a methyl group, and X represents hydrogen atom or a cation, and when X is a cation, the oxygen adjacent to the cation is in a form of O⁻.

4. The ink set according to claim 1, wherein a dry matter obtained by drying the second ink has a storage modulus G' of $7.0 \times 10^8$ Pa or lower in a dynamic viscoelasticity measurement at 25 degrees C.

5. The ink set according to claim 1, wherein the second ink further contains an urethane resin.

6. The ink set according to claim 1, wherein the first ink further contains an urethane resin.

7. An inkjet recording method comprising:
   discharging the first ink and the second ink contained in the ink set according to claim 1 from a discharging head; and
   applying the first ink and the second ink onto a recording medium, the recording medium comprising at least one of a fabric and a plastic film.

* * * * *